(12) United States Patent
Hamrodi et al.

(10) Patent No.: US 10,508,689 B2
(45) Date of Patent: Dec. 17, 2019

(54) THRUST BEARING FOR VEHICLE

(71) Applicants: OILES CORPORATION, Tokyo (JP); OILES DEUTSCHLAND GMBH, Ober-Moerlen (DE)

(72) Inventors: Robert Hamrodi, Ober-Moerlen (DE); Kai Metzler, Ober-Moerlen (DE); Tsuyoshi Nagashima, Ober-Moerlen (DE); Kohei Kurose, Fujisawa (JP)

(73) Assignees: OILES CORPORATION, Tokyo (JP); OILES DEUTSCHLAND GMBH, Ober-Moerlen (DE)

( * ) Notice: Subject to any disclaimer, the term of this patent is extended or adjusted under 35 U.S.C. 154(b) by 195 days.

(21) Appl. No.: 15/503,420

(22) PCT Filed: Sep. 9, 2015

(86) PCT No.: PCT/JP2015/075545
§ 371 (c)(1),
(2) Date: Feb. 13, 2017

(87) PCT Pub. No.: WO2016/052106
PCT Pub. Date: Apr. 7, 2016

(65) Prior Publication Data
US 2017/0227057 A1  Aug. 10, 2017

(30) Foreign Application Priority Data

Sep. 29, 2014 (JP) ................................ 2014-198896

(51) Int. Cl.
*F16C 41/00* (2006.01)
*B60G 17/019* (2006.01)
(Continued)

(52) U.S. Cl.
CPC ............ *F16C 41/00* (2013.01); *B60G 17/019* (2013.01); *B60T 8/1837* (2013.01); *G01L 1/243* (2013.01);
(Continued)

(58) Field of Classification Search
CPC .... F16C 41/00; F16C 41/005; F16C 2233/00; F16C 2326/05; B60G 17/019;
(Continued)

(56) References Cited

U.S. PATENT DOCUMENTS 5,072,611 A * 12/1991 Budd ................. G01M 13/045
73/10
5,269,383 A * 12/1993 Forrest ..................... E21B 4/02
175/106
(Continued)

FOREIGN PATENT DOCUMENTS

JP  H03-065418 A  3/1991
JP  H04-043088 U  4/1992
(Continued)

OTHER PUBLICATIONS

English Translation of JP 2005-090525 (Year: 2005).*
(Continued)

*Primary Examiner* — Thomas E Worden
(74) *Attorney, Agent, or Firm* — Posz Law Group, PLC

(57) ABSTRACT

A thrust bearing for a vehicle includes an upper case that abuts against a vehicle body-side attaching portion and a lower case on which the upper case is provided so that the lower case is rotatable with respect to the upper case about an axial center AX of a piston rod used in a shock absorber of a suspension of the vehicle, characterized in that the thrust bearing further includes a load sensor for measuring a load vertically acting on the suspension.

8 Claims, 13 Drawing Sheets

(51) Int. Cl.
  *B60T 8/18* (2006.01)
  *G01L 1/24* (2006.01)
  *G01L 5/00* (2006.01)
  *G07C 5/00* (2006.01)
  *B60G 15/06* (2006.01)

(52) U.S. Cl.
  CPC .......... *G01L 5/0009* (2013.01); *G01L 5/0019* (2013.01); *G07C 5/008* (2013.01); *B60G 15/06* (2013.01); *F16C 2233/00* (2013.01); *F16C 2326/05* (2013.01)

(58) Field of Classification Search
  CPC ....... B60G 15/06; B60T 8/1837; G01L 1/243; G01L 5/0009; G01L 5/0019; G07C 5/008
  See application file for complete search history.

(56) References Cited

U.S. PATENT DOCUMENTS

| | | | | |
|---|---|---|---|---|
| 7,032,912 | B2 * | 4/2006 | Nicot | B60G 17/04 267/267 |
| RE39,838 | E * | 9/2007 | McDearmon | G01L 5/0019 73/795 |
| 8,550,863 | B1 * | 10/2013 | von Wolske | B63H 23/34 440/57 |
| 2004/0100057 | A1 * | 5/2004 | Nicot | B60G 17/019 280/93.5 |
| 2008/0142102 | A1 * | 6/2008 | Savard | F04B 43/067 137/854 |
| 2008/0319383 | A1 * | 12/2008 | Byland | A61M 5/30 604/67 |
| 2009/0229905 | A1 * | 9/2009 | Kato | B60K 23/0808 180/249 |
| 2011/0082004 | A1 * | 4/2011 | Kato | B60K 17/344 475/303 |
| 2011/0118071 | A1 * | 5/2011 | De Maziere | F16H 37/086 475/114 |
| 2012/0303193 | A1 * | 11/2012 | Gresser | B60G 17/0157 701/22 |
| 2014/0172132 | A1 * | 6/2014 | Ura | A61B 5/6823 700/90 |
| 2014/0212081 | A1 * | 7/2014 | Takahashi | B60B 27/0068 384/448 |
| 2015/0337956 | A1 * | 11/2015 | De Maziere | F16H 61/6649 475/185 |
| 2016/0297102 | A1 * | 10/2016 | Okada | B29B 7/183 |
| 2017/0217274 | A1 * | 8/2017 | Nagashima | B60G 15/06 |

FOREIGN PATENT DOCUMENTS

| | | | |
|---|---|---|---|
| JP | H08-132840 | A | 5/1996 |
| JP | H09-061268 | A | 3/1997 |
| JP | H09-142123 | A | 6/1997 |
| JP | 2004-034865 | A | 2/2004 |
| JP | 2004-177411 | A | 6/2004 |
| JP | 2004-182223 | A | 7/2004 |
| JP | 2005-090525 | A | 4/2005 |
| JP | 2005090525 | A * | 4/2005 |
| JP | 2006-170352 | A | 6/2006 |
| JP | 2009-216664 | A | 9/2009 |
| JP | 2010-085215 | A | 4/2010 |
| JP | 2013-076573 | A | 4/2013 |

OTHER PUBLICATIONS

Extended European Search Report dated Apr. 19, 2018 in the corresponding European Patent Application No. 15846137.6.
International Search Report of the International Searching Authority dated Dec. 22, 2015 for the corresponding International application No. PCT/JP2015/075545 (and English translation).
Office Action dated Jul. 30, 2018 issued in corresponding CN patent application No. 201580048254.3 (and English translation).
Office Action dated Aug. 7, 2018 issued in corresponding JP patent application No. 2014-198896 (and English translation).
Office Action dated Feb. 5, 2019 in corresponding Japanese patent application No. 2014-198896 (and English translation).

* cited by examiner

THRUST BEARING FOR VEHICLE

CROSS REFERENCE TO RELATED APPLICATIONS

This application is a U.S. national stage application of PCT/JP2015/075545 filed on Sep. 9, 2015, which claims priority to Japanese Patent Application No. 2014-198896 filed on Sep. 29, 2014, the contents of which are incorporated herein by reference.

TECHNICAL FIELD

The present invention relates to a thrust bearing for a vehicle, comprising an upper case and a lower case that are rotatable with respect to each other. Particularly, the present invention relates to a thrust bearing incorporated into a four-wheeled vehicle as a thrust bearing of a strut-type (McPherson) suspension of a front wheel of the vehicle.

BACKGROUND ART

A strut-type suspension used for a front wheel of a four-wheeled vehicle generally includes a strut assembly combined with a coil spring. The strut assembly has an external cylinder that is integrated with a main shaft and in which a hydraulic/gas shock absorber is incorporated.

Strut-type suspensions can be classified based on whether a piston rod of the strut assembly rotates or not when the strut assembly rotates with the coil spring under steering operation. In either case, a thrust bearing is used between an attachment mechanism of the strut assembly for attaching to the vehicle and an upper end portion of the coil spring for allowing smooth rotation of the strut assembly.

Conventionally, there is a suspension control apparatus that includes, as a strut bearing for a vehicle, a top cup into which an upper end portion of a piston rod used in a shock absorber of a strut-type suspension is inserted, a bottom cup on which the top cup is provided so that the bottom cup is rotatable with respect to the top cup about an axial center of the piston rod, a rotating member that is provided in an annular space formed between a fixed top race connected to the top cup and a rotating bottom race connected to the bottom cup for receiving a thrust load of the piston rod, a coder that is rotatably attached to the rotating bottom race and generates a pulse, and a sensor that is fixed to the coder and detects a pulse for measuring a rotating angle of the rotating bottom race (See Patent Literature 1).

Also, there is another suspension control apparatus that includes, as a strut bearing for a vehicle, a top cup into which an upper end portion of a piston rod used in a shock absorber of a strut-type suspension is inserted, a bottom cup on which the top cup is provided so that the bottom cup is rotatable with respect to the top cup about an axial center of the piston rod, a rotating member that is provided in an annular space formed between a fixed top race connected to the top cup and a rotating bottom race connected to the bottom cup for receiving a thrust load of the piston rod, and a deformation sensor that is connected to the top cup and the bottom cup, which are fixed members, and measures the amount of deformation of the fixed members due to a force acting on a wheel (See Patent Literature 2).

CITATION LIST

Patent Literature

[Patent Literature 1] Japanese Patent Laid-Open No. 2004-182223
[Patent Literature 2] Japanese Patent Laid-Open No. 2004-177411

SUMMARY OF INVENTION

Technical Problem

However, the former of the aforementioned conventional suspension control apparatuses calculates a vertical force by measuring the rotating angle of the bottom race with respect to the top race by the sensor. Thus, it is difficult to precisely measure a load vertically acting on the suspension of each wheel while the vehicle is running.

Also, the latter of the aforementioned conventional suspension control apparatuses indirectly calculates a vertical force by continuously measuring the amount of deformation of the top cup and the bottom cup, which are fixed members, by the deformation sensor. Thus, it is difficult to precisely measure a load vertically acting on the suspension of each wheel while the vehicle is running.

It is thus an object of the present invention, which has been achieved for addressing the aforementioned problems of the prior art, to provide a thrust bearing for a vehicle, the thrust bearing being capable of precisely measuring a load vertically acting on the suspension of each wheel while the vehicle is running.

Solution to Problem

In order to address the above-described problems, a first aspect of the present invention provides a thrust bearing for a vehicle, the thrust bearing including an upper case that abuts against a vehicle body-side attaching portion and a lower case on which the upper case is provided so that the lower case is rotatable with respect to the upper case about an axial center of a piston rod used in a shock absorber of a suspension of the vehicle, wherein the thrust bearing further includes a load sensor for measuring a load vertically acting on the suspension.

A second aspect of the present invention further addresses the above-described problems by providing the thrust bearing for a vehicle according to the first aspect of the present invention, wherein an annular bearing piece for receiving a thrust load acting on the thrust bearing is disposed in an annular space formed between the upper case and the lower case.

A third aspect of the present invention further addresses the above-described problems by providing the thrust bearing for a vehicle according to the second aspect of the present invention, wherein the load sensor is provided in either the upper case, the bearing piece, or the lower case.

A fourth aspect of the present invention further addresses the above-described problems by providing the thrust bearing for a vehicle according to any one of the first to third aspects of the present invention, wherein the load sensor is a hydraulic load sensor for measuring the load.

A fifth aspect of the present invention further addresses the above-described problems by providing the thrust bearing for a vehicle according to the fourth aspect of the present invention, wherein the hydraulic load sensor includes an annular liquid inclusion body for receiving the load vertically acting on the suspension and a pressure/signal converter connected to the annular liquid inclusion body for converting the pressure of a liquid within the annular liquid inclusion body to a signal, and the annular liquid inclusion body is arranged concentrically with respect to an axial center of the thrust bearing.

A sixth aspect of the present invention further addresses the above-described problems by providing the thrust bearing for a vehicle according to the fifth aspect of the present invention, wherein the annular liquid inclusion body is mounted in an annular concave portion provided on a case top surface of the upper case, and a load receiving surface is formed at an upper end of the annular liquid inclusion body so as to upwardly project from the case top surface of the upper case, the load receiving surface being in contact with the vehicle body-side attaching portion for receiving a load.

A seventh aspect of the present invention further addresses the above-described problems by providing the thrust bearing for a vehicle according to any one of the first to third aspects of the present invention, wherein the load censor is a film-type load sensor for measuring the load.

An eighth aspect of the present invention further addresses the above-described problems by providing the thrust bearing for a vehicle according to the seventh aspect of the present invention, wherein the film-type load sensor includes a film layer that deforms in accordance with the amount of the load vertically acting on the suspension, and an electric resistance of the film layer varies in accordance with the amount of the deformation due to the load vertically acting on the suspension.

A ninth aspect of the present invention further addresses the above-described problems by providing the thrust bearing for a vehicle according to the eighth aspect of the present invention, wherein the film layer is arranged on a bottom of a concave portion provided on a case top surface of the upper case, and a spacing member is provided on the film layer in the concave portion, at least a part of the spacing member on a top surface side thereof upwardly projecting from the case top surface of the upper case and being in contact with the vehicle body-side attaching portion.

A tenth aspect of the present invention further addresses the above-described problems by providing the thrust bearing for a vehicle according to the eighth or ninth aspect of the present invention, wherein a plurality of the film layers are arranged in a circumferential direction of the piston rod, and the total electric resistance of the plurality of the film layers is used as a value of the load vertically acting on the suspension.

An eleventh aspect of the present invention further addresses the above-described problems by providing the thrust bearing for a vehicle according to any one of the first to third aspects of the present invention, wherein the load sensor is an optical fiber-type load sensor for measuring the load.

A twelfth aspect of the present invention further addresses the above-described problems by providing the thrust bearing for a vehicle according to the eleventh aspect of the present invention, wherein the optical fiber-type load sensor includes a light emitting portion that emits light, an optical fiber that guides the light from the light emitting part and deforms in accordance with the amount of the load vertically acting on the suspension, and a light receiving portion that receives the light propagated through the optical fiber and measures a phase of the light, and a phase of a waveform propagated through the optical fiber varies in accordance with the amount of deformation of the optical fiber due to the load vertically acting on the suspension.

A thirteenth aspect of the present invention further addresses the above-described problems by providing the thrust bearing for a vehicle according to the twelfth aspect of the present invention, wherein the optical fiber is arranged on a bottom of a concave portion provided on a case top surface of the uppercase, and a spacing member is provided on the optical fiber in the concave portion, at least a part of the spacing member on a top surface side thereof upwardly projecting from the case top surface of the upper case and being in contact with the vehicle body-side attaching portion.

A fourteenth aspect of the present invention further addresses the above-described problems by providing the thrust bearing for a vehicle according to any one of the first to thirteenth aspects of the present invention, wherein the suspension is a strut-type suspension.

A fifteenth aspect of the present invention further addresses the above-described problems by providing the thrust bearing for a vehicle according to any one of the first to fourteenth aspects of the present invention, wherein the load sensor is connected to a controller that controls a brake of the vehicle by receiving an output signal from the load sensor, and the controller controls a braking force of the brake in accordance with the amount of load vertically acting on the suspension when a driver of the vehicle manipulates the brake.

A sixteen aspect of the present invention further addresses the above-described problems by providing the thrust bearing for a vehicle according to any one of the first to fourteenth aspects of the present invention, wherein the load sensor is connected via a communication circuit to a load amount manager that manages a load amount of the vehicle by receiving an output signal from the load sensor, and the load amount manager manages the load amount of each vehicle online.

A seventeenth aspect of the present invention further addresses the above-described problems by providing the thrust bearing for a vehicle according to any one of the first to fourteenth aspects of the present invention, wherein the load sensor is connected to a controller that controls at least either a damping force of the shock absorber or a spring rate of an air suspension by receiving an output signal from the load sensor, and the controller controls at least either the damping force or the spring rate in accordance with the amount of load vertically acting on the suspension.

An eighteenth aspect of the present invention further addresses the above-described problems by providing the thrust bearing for a vehicle according to any one of the first to fourteenth aspects of the present invention, wherein the load sensor is connected to a controller that controls at least either a damping force of the shock absorber or a spring rate of an air suspension by receiving an output signal from the load sensor to monitor longitudinal and lateral balances of the vehicle, and the controller controls at least either the damping force or the spring rate in accordance with longitudinal and lateral differences between the amounts of a vertically acting load measured by each suspension of the vehicle so that the tilt of the vehicle is reduced.

A nineteenth aspect of the present invention further addresses the above-described problems by providing the thrust bearing for a vehicle according to any one of the first to fourteenth aspects of the present invention, wherein the load sensor is connected to a controller that actively controls a damping force of the shock absorber by receiving an output signal from the load sensor to monitor an input load from a tire.

Advantageous Effects of Invention

Because the thrust bearing of the present invention includes an upper case that abuts against a vehicle body-side attaching portion and a lower case on which the upper case is provided so that the lower case is rotatable with respect to the upper case about an axial center of a piston rod used in a shock absorber of a suspension of the vehicle, not only the upper case and the lower case can rotate smoothly with respect to each other but also the following unique effects can be achieved.

According to the thrust bearing for a vehicle of the first aspect of the present invention, because the thrust bearing further includes a load sensor for measuring a load vertically acting on the suspension, a load acts on the load sensor of the suspension of each wheel of the vehicle, such as an automobile or a truck, while the vehicle is running. Thus, it is possible to precisely measure a load vertically acting on the strut-type suspension of each wheel while the vehicle is running.

According to the thrust bearing for a vehicle of the second aspect of the present invention, because an annular bearing piece for receiving a thrust load acting on the thrust bearing is disposed in an annular space formed between the upper case and the lower case, the frictional resistance between the upper case and the lower case is reduced. Thus, the upper case and the lower case can rotate more smoothly with respect to each other.

According to the thrust bearing for a vehicle of the third aspect of the present invention, because the load sensor is provided in either the upper case, the bearing piece, or the lower case, a load acts on the load sensor more reliably. Thus, it is possible to more precisely measure a load vertically acting on the suspension of each wheel while the vehicle is running.

According to the thrust bearing for a vehicle of the fourth aspect of the present invention, because the load sensor is a hydraulic load sensor for measuring the load, it is possible to precisely measure the load.

According to the thrust bearing for a vehicle of the fifth aspect of the present invention, because the hydraulic load sensor includes an annular liquid inclusion body for receiving the load vertically acting on the suspension and a pressure/signal converter connected to the annular liquid inclusion body for converting the pressure of a liquid within the annular liquid inclusion body to a signal, and the annular liquid inclusion body is arranged concentrically with respect to an axial center of the thrust bearing, the pressure of the liquid in the annular liquid inclusion body acts evenly on the entire annular liquid inclusion body even if a load vertically acts on the suspension in a regionally biased manner around the axial center of the thrust bearing while the vehicle is running. Thus, it is possible to precisely measure the load.

According to the thrust bearing for a vehicle of the sixth aspect of the present invention, because the annular liquid inclusion body is mounted in an annular concave portion provided on a case top surface of the upper case, and a load receiving surface is formed at an upper end of the annular liquid inclusion body so as to upwardly project from the case top surface of the upper case to come into contact with the vehicle body-side attaching portion for receiving a load, the load receiving surface is displaced by receiving a load from the vehicle body-side attaching portion on the whole surface thereof in an unbiased manner without being in contact with peripheral members. Thus, it is possible to more precisely measure a load vertically acting on each suspension.

According to the thrust bearing for a vehicle of the seventh aspect of the present invention, because the load censor is a film-type load sensor for measuring the load, it is possible to precisely measure the load.

According to the thrust bearing for a vehicle of the eighth aspect of the present invention, because the film-type load sensor includes a film layer that deforms in accordance with the amount of the load vertically acting on the suspension, and an electric resistance of the film layer varies in accordance with the amount of deformation due to the load vertically acting on the suspension, the value of electric current flowing through the film layer varies in accordance with the amount of the load vertically acting on the suspension. Thus, it is possible to precisely measure the load by simply measuring the value of electric current.

According to the thrust bearing for a vehicle of the ninth aspect of the present invention, because the film layer is arranged on a bottom of a concave portion provided on a case top surface of the upper case, and a spacing member is provided on the film layer in the concave portion, at least a part of the spacing member on a top surface side thereof upwardly projecting from the case top surface of the upper case and being in contact with the vehicle body-side attaching portion, a load of the vehicle acts on the film layer by way of the spacing member with little interference from other members. Thus, it is possible to more precisely measure the load of the vehicle acting on each suspension.

According to the thrust bearing for a vehicle of the tenth aspect of the present invention, because a plurality of the film layers are arranged in a circumferential direction of the piston rod, and the total electric resistance of the plurality of the film layers is used as a value of the load vertically acting on the suspension, the bias of the load in the circumferential direction does not affect the value of the load. Thus, it is possible to more precisely measure the load of the vehicle acting on each suspension.

According to the thrust bearing for a vehicle of the eleventh aspect of the present invention, because the load sensor is an optical fiber-type load sensor for measuring the load, it is possible to precisely measure the load.

According to the thrust bearing for a vehicle of the twelfth aspect of the present invention, because the optical fiber-type load sensor includes a light emitting portion that emits light, an optical fiber that guides the light from the light emitting portion and deforms in accordance with the amount of the load vertically acting on the suspension, and a light receiving portion that receives the light propagated through the optical fiber and measures a phase of the light, and a phase of a waveform propagated through the optical fiber varies in accordance with the amount of deformation of the optical fiber due to the load vertically acting on the suspension, the phase of the waveform varies in accordance with the amount of the load vertically acting on the suspension. Thus, it is possible to precisely measure the load by simply measuring the phase of the waveform.

According to the thrust bearing for a vehicle of the thirteenth aspect of the present invention, because the optical fiber is arranged on a bottom of a concave portion provided on a case top surface of the uppercase, and a spacing member is provided on the optical fiber in the concave portion, at least a part of the spacing member on a top surface side thereof upwardly projecting from the case top surface of the upper case and being in contact with the vehicle body-side attaching portion, a load of the vehicle acts on the optical fiber via the spacing member with little interference from other members. Thus, it is possible to more precisely measure the load of the vehicle acting on each suspension.

According to the thrust bearing for a vehicle of the fourteenth aspect of the present invention, because the suspension is a strut-type suspension, a strut assembly rotates with a coil spring under steering operation to generate a turning force. Thus, it is possible to allow smooth rotation of the strut assembly.

According to the thrust bearing for a vehicle of the fifteenth aspect of the present invention, because the load sensor is connected to a controller that controls a brake of the vehicle by receiving an output signal from the load sensor, and the controller controls a braking force of the brake in accordance with the amount of load vertically acting on the suspension when a driver of the vehicle manipulates the brake, the braking force of the brake can be made larger as the load acting on the suspension becomes larger, for example. Thus, it is possible to stably decelerate the vehicle even when a load amount of the vehicle changes and to reduce the difference of a braking distance between various load amounts.

According to the thrust bearing for a vehicle of the sixteenth aspect of the present invention, because the load sensor is connected via a communication circuit to a load amount manager that manages a load amount of the vehicle by receiving an output signal from the load sensor, and the load amount manager manages the load amount of each vehicle online, information about the load amount of each vehicle is gathered in an control center of a carrying company, for example. Thus, the control center of the carrying company can comprehend the current load amount of each vehicle to efficiently give each vehicle an instruction for collecting goods.

According to the thrust bearing for a vehicle of the seventeenth aspect of the present invention, because the load sensor is connected to a controller that controls at least either a damping force of the shock absorber or a spring rate of an air suspension by receiving an output signal from the load sensor, and the controller controls at least either the damping force or the spring rate in accordance with the amount of load vertically acting on the suspension, the damping force or the spring rate can be increased as the amount of the load increases, for example, for receiving the increase of the load. Thus, it is possible to ensure the running stability of the vehicle even when the load amount of the vehicle changes.

According to the thrust bearing for a vehicle of the eighteenth aspect of the present invention, because the load sensor is connected to a controller that controls at least either a damping force of the shock absorber or a spring rate of an air suspension by receiving an output signal from the load sensor to monitor longitudinal and lateral balances of the vehicle, and the controller controls at least either the damping force or the spring rate in accordance with longitudinal and lateral differences between the amounts of a vertically acting load measured by each suspension of the vehicle so that the tilt of the vehicle is reduced, the damping force or the spring rate can be increased in a left, right, front, or rear type suspension that is burdened with a larger movable load to reduce the tilt of the vehicle, for example. Thus, it is possible to ensure the running stability of the vehicle by controlling the posture of the vehicle even when the center of gravity of the movable load deviates from the center of the vehicle.

According to the thrust bearing for a vehicle of the nineteenth aspect of the present invention, because the load sensor is connected to a controller that actively controls a damping force of the shock absorber by receiving an output signal from the load sensor to monitor an input load from a tire, the damping force can be reduced when the vehicle enters a rough load, for example, for receiving an input load in a temporally distributed manner. Thus, it is possible to ensure the running stability of the vehicle.

DESCRIPTION OF EMBODIMENTS

The specific embodiment of the present invention may be anything as long as the thrust bearing of the present invention includes an upper case that abuts against a vehicle body-side attaching portion and a lower case on which the upper case is provided so that the lower case is rotatable with respect to the upper case about an axial center of a piston rod used in a shock absorber of a suspension of the vehicle, wherein the thrust bearing further includes a load sensor for measuring a load vertically acting on the suspension, enabling precise measurement of the load vertically acting on the suspension of each wheel while the vehicle is running.

For example, the thrust bearing may include a bearing piece existing in an annular space formed between the upper case and the lower case for receiving a thrust load acting from a tire side, or the upper case and the lower case may directly slide with respect to each other without using the bearing piece.

If the thrust bearing includes the bearing piece, the bearing piece may be a sliding bearing that slides with respect to the upper case or the lower case, or may be a rolling bearing that rotatably holds a rolling element such as a ball.

The load sensor may be any type such as a hydraulic sensor, a film-type sensor, or an optical fiber-type sensor as long as the load sensor is capable of measuring a load vertically acting on a suspension.

The suspension of the vehicle may be any type as long as a thrust load acts on the suspension from a tire side.

The upper case is only required to abut against the vehicle body-side attachment portion. The strut-type suspension as one example of the suspension may be one type in which the upper end portion of the piston rod of the shock absorber fits into the vehicle body-side attachment portion, or another type in which the upper end portion of the piston rod of the shock absorber fits into the upper case.

Embodiment 1

A thrust bearing 100 as a thrust bearing for a vehicle of the first embodiment of the present invention will now be described in accordance with FIGS. 1 to 4.

Figure 1A:
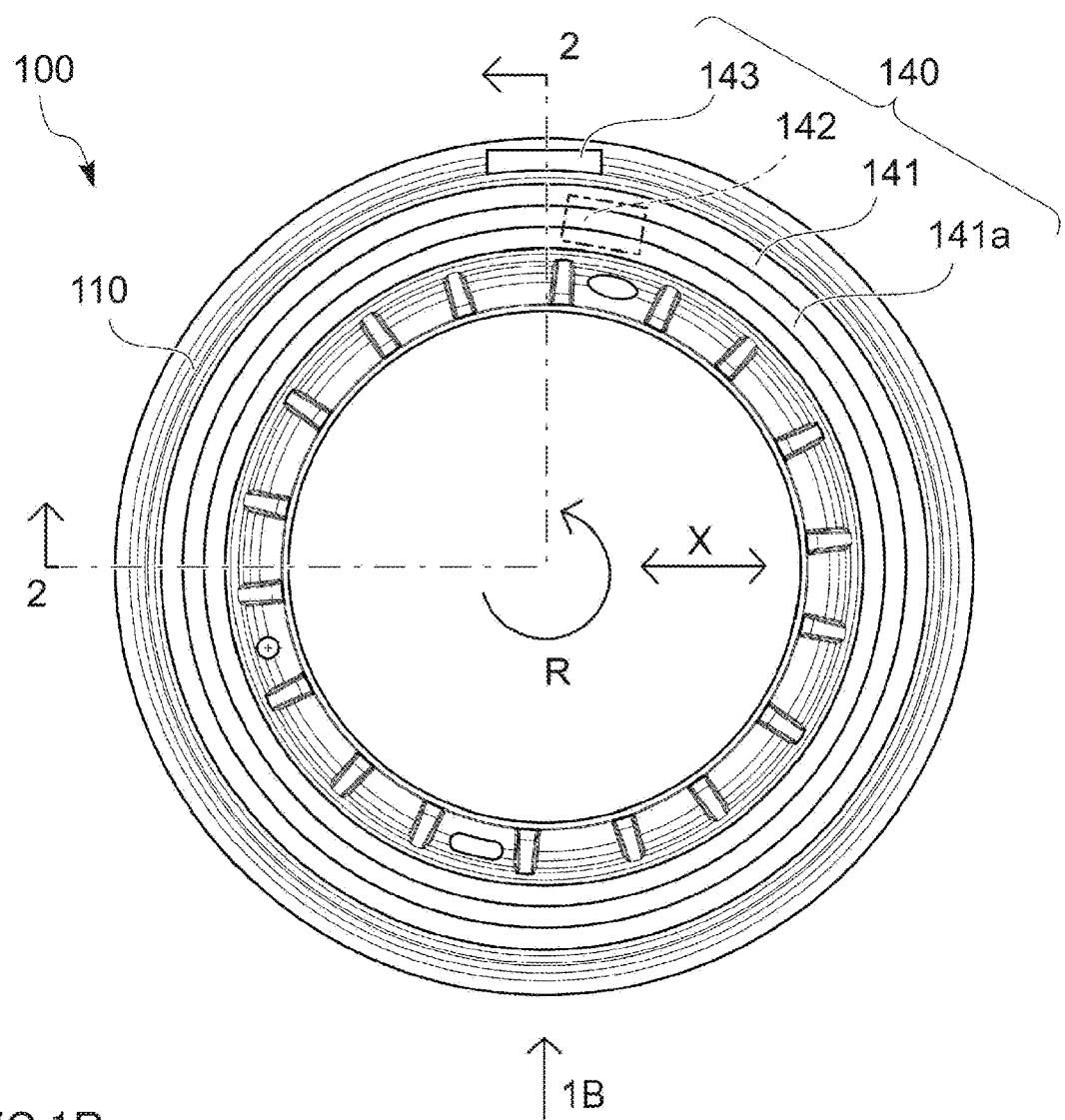
FIGS. 1(A) and 1(B) are top and side views of a thrust bearing for a vehicle as a first embodiment of the present invention.
Figure 1B:
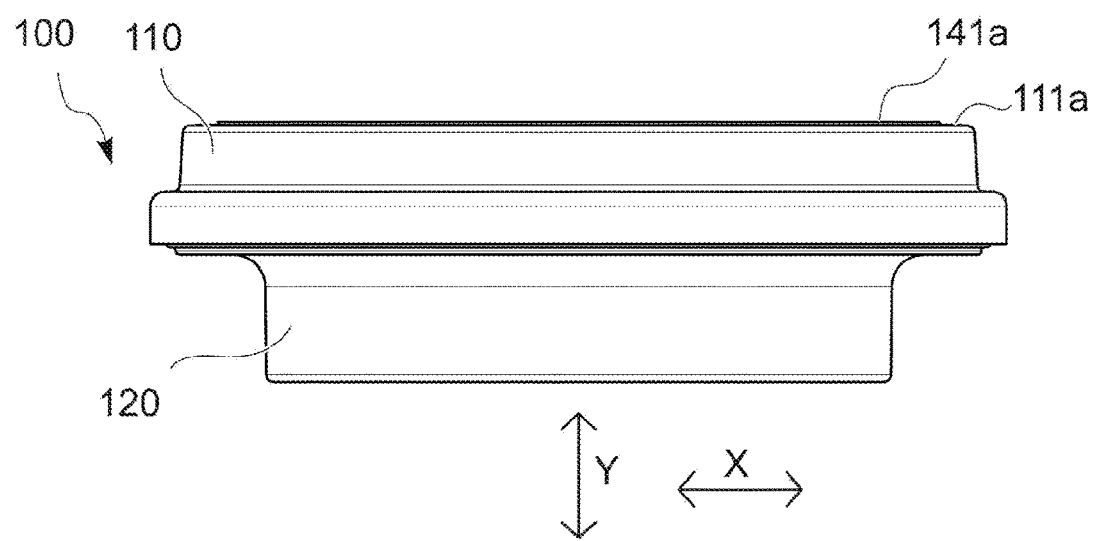
Figure 2:
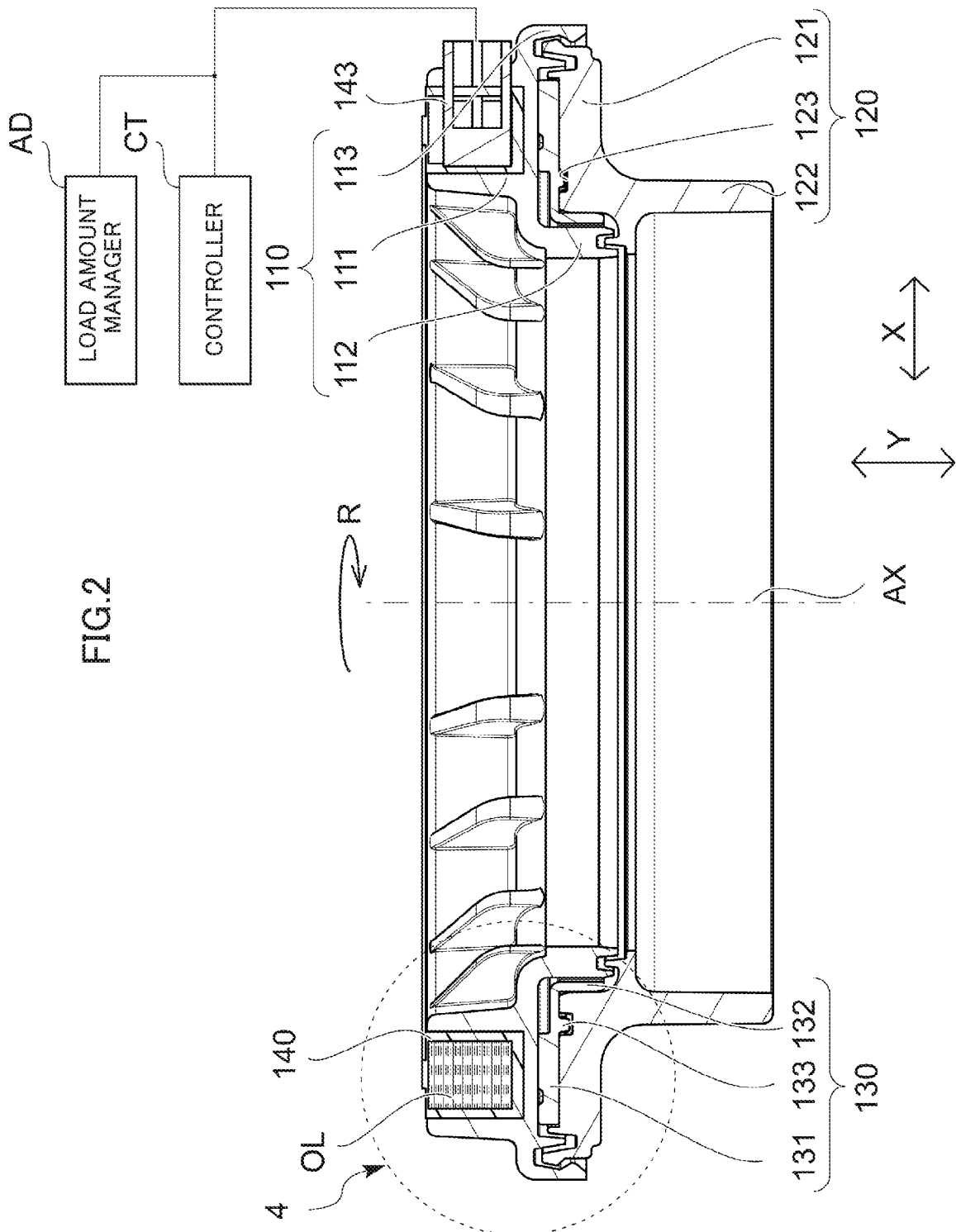
FIG. 2 is a cross-sectional view as seen along line 2-2 illustrated in FIG. 1(A).
Figure 3:
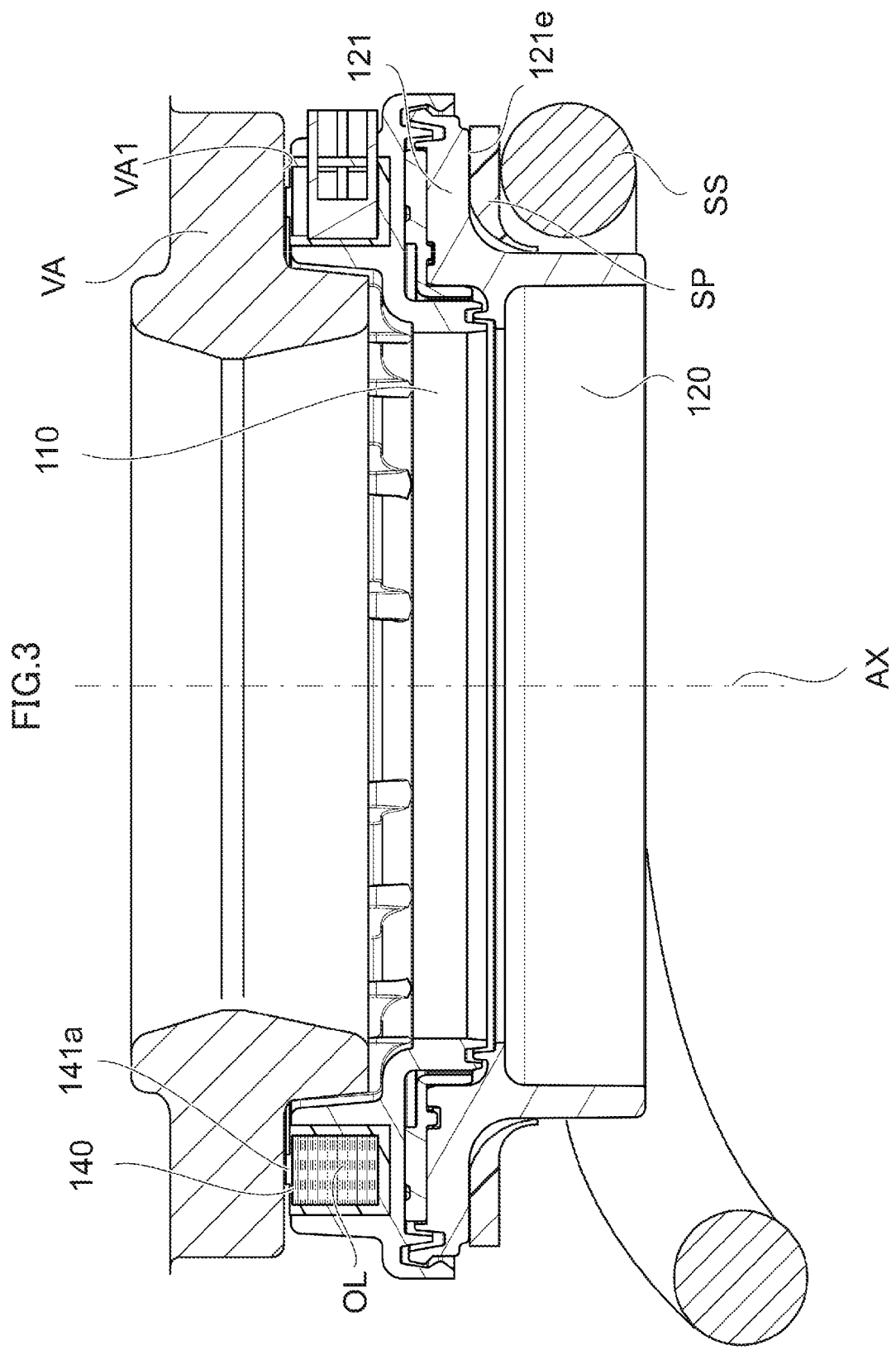
FIG. 3 is a cross-sectional view of the thrust bearing for a vehicle of the first embodiment of the present invention incorporated into a strut-type suspension.
Figure 4:
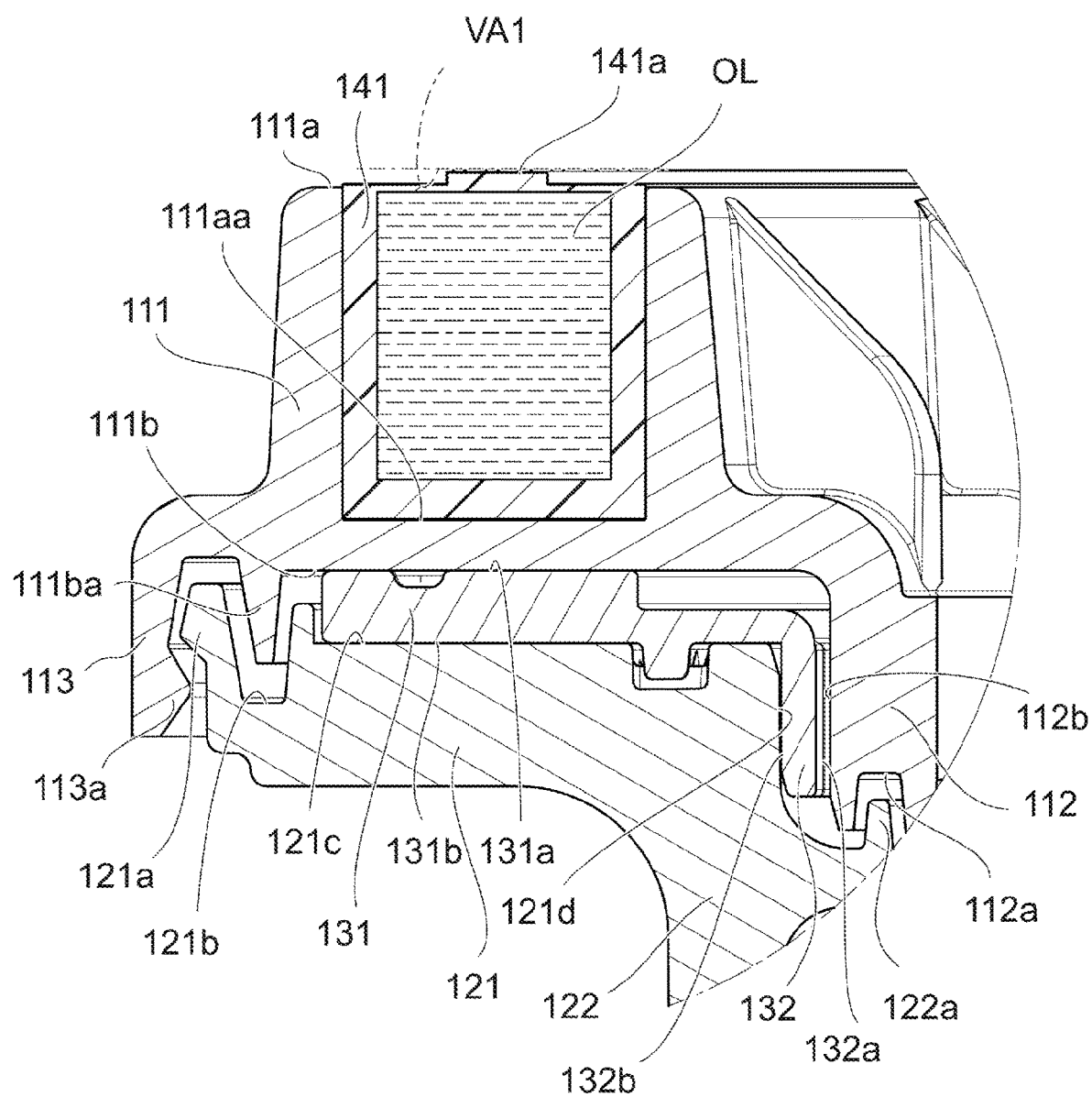
FIG. 4 is an enlarged cross-sectional view of the portion represented with reference numeral 4 in FIG. 2.

FIG. 1(A) is a top view of the thrust bearing 100 for a vehicle as the first embodiment of the present invention. FIG. 1(B) is a side view as seen in a direction represented with reference numeral 1B in FIG. 1(A). FIG. 2 is a cross-sectional view as seen along line 2-2 illustrated in FIG. 1(A). FIG. 3 is a cross-sectional view of the thrust bearing 100 for a vehicle as the first embodiment of the present invention incorporated into a strut-type suspension. FIG. 4 is an enlarged cross-sectional view of the portion represented with reference numeral 4 in FIG. 2.

As shown in FIGS. 1(A) to 4, the thrust bearing 100 for a vehicle as the first embodiment of the present invention includes an upper case 110 made of synthetic resin, a lower case 120 made of synthetic resin, and a sliding bearing piece 130 as a bearing piece made of synthetic resin.

The upper case 110 is configured to abut against a vehicle-side attaching member VA, or a vehicle body-side attaching portion.

In the present embodiment, the upper case 110 integrally includes an annular upper case base 111 that is mounted on the vehicle and forms an annular upper case top surface 111a and an annular upper case bottom surface 111b along an axial direction Y of a piston rod, an inner circumferential-side cylindrical portion 112 that downwardly extends from an inner circumferential end in a radial direction X of the upper case base 111, and an outer circumferential cylindrical portion 113 that downwardly extends from an outer circumferential end in the radial direction X of the upper case base 111.

An annular concavity 111aa as an annular concave portion is formed on the upper case top surface 111a of the upper case base 111. An annular oil inclusion body 141 and a pressure/signal converter 142 of a hydraulic load sensor 140, which will be described later, are provided in the annular concavity 111aa.

The upper case 110 is provided on the lower case 120 so that the lower case 120 is rotatable with respect to the upper case 110 about an axial center AX of the piston rod.

In the present embodiment, the lower case 120 integrally includes an annular lower case base 121 on which the upper case 110 is provided so that the lower case base 121 is rotatable with respect to the upper case 110 about the axial center AX, and an inner circumferential-side cylindrical portion 122 that downwardly extends from a radial inner side of the lower case base 121.

An inner annular engaging claw 121a is formed on a radial outer side of the lower case base 121. The inner annular engaging claw 121a engages with an outer annular engaging claw 113a formed on an outer circumference-side cylindrical portion 113 of the upper case 110 so as to be rotatable in a circumferential direction R.

An outer annular engaging groove 121b is formed radially inward of the inner annular engaging claw 121a of the lower case base 121. The outer annular engaging groove 121b engages, via a small gap, with an outer annular engaging ridge 111ba formed on the upper case bottom surface 111b of the upper case base 111.

This prevents an extraneous substance from entering an annular space formed between the upper case 110 and the lower case 120 from radial outside of the annular space.

An inner annular engaging ridge 122a is formed inward of the inner circumferential-side cylindrical portion 122 of the lower case 120. The inner annular engaging ridge 122a engages, via small gap, with an inner annular engaging groove 112a formed on a lower end of the inner circumferential-side cylindrical portion 112 of the upper case 110.

This prevents an extraneous substance from entering the annular space formed between the upper case 110 and the lower case 120 from radial inside of the annular space.

The sliding bearing piece 130 exists in the annular space formed between the upper case 110 and the lower case 120 for receiving thrust and radial loads acting from a tire side.

In the present embodiment, the sliding bearing piece 130 is arranged in an annular space between the upper case bottom surface 111b of the upper case base 111 and the lower case top surface 121c of the lower case base 121 and in an annular space between an outer circumferential surface 112b of the inner circumference-side cylindrical portion 112 and an inner circumferential surface 121d of the lower case base 121.

The sliding bearing piece 130 includes an annular thrust sliding bearing piece portion 131, a cylindrical radial sliding bearing piece portion 132, and an anti-rotation convex portion 133 downwardly projecting from the thrust sliding bearing piece portion 131.

The thrust sliding bearing piece portion 131 includes a bearing top surface 131a that slidably contacts with the upper case bottom surface 111b of the upper case base 111, and a bearing bottom surface 131b that contacts with the lower case top surface 121c of the lower case base 121 of the lower case 120.

On the other hand, the radial sliding bearing piece portion 132 includes a bearing inner circumferential surface 132a that slidably contacts with the outer circumferential surface 112b of the inner circumference-side cylindrical portion 112 of the upper case 110, and an outer circumferential surface 132b that contacts with the inner circumferential surface 121d of the lower case base 121 of the lower case 120.

The anti-rotation convex portion 133 engages with an anti-rotation concave portion 123 formed on the lower case top surface 121c of the lower case 120 to restrict the rotation of the sliding bearing piece 130 with respect to the lower case 120.

In the present embodiment, as one example, the anti-rotation convex portion 133 and the anti-rotation concave portion 123 are provided to prevent the sliding bearing piece 130 from rotating with respect to the lower case 120. Alternatively, the anti-rotation convex portion 133 and the anti-rotation concave portion 123 may not be provided so that the sliding bearing piece 130 can rotate with respect to the lower case 120.

As shown in FIG. 3, a spring pad SP made of rubber in an annular shape is provided on a lower case bottom surface 121e of the lower case base 121.

The thrust bearing 100 is incorporated into a strut-type (McPherson) suspension so as to be arranged between a vehicle-side sitting surface VA1 of the vehicle-side attaching member VA and a coil spring SS, wherein a load receiving surface 141a of the annular oil inclusion body 141 of the hydraulic load sensor 140 provided in the annular concavity 111aa of the upper case 110 abuts against the vehicle-side sitting surface VA1 of the vehicle-side attaching member VA, as described later, and the spring pad SP abuts against an upper end portion of the coil spring SS.

In the present embodiment, the hydraulic load sensor 140, which is a hydraulic load sensor for measuring a movable load, or a load vertically acting on the strut-type suspension, is provided in the annular concavity 111aa of the upper case 110, for example. Alternatively, the hydraulic load sensor 140 may be provided in the lower case 120.

With this configuration, a movable load acts on the hydraulic load sensor 140 in each strut-type suspension mounted on a vehicle such as an automobile and a truck.

Specifically, the hydraulic load sensor 140 includes the annular oil inclusion body 141 that receives a movable load vertically acting on the strut-type suspension and a pressure/signal converter 142 that is connected to the annular oil inclusion body 141 and converts the pressure of oil OL in the annular oil inclusion body 141 to a signal.

Furthermore, the annular oil inclusion body 141 is arranged concentrically with respect to the axial center AX of the piston rod.

With this configuration, the pressure of the oil OL in the annular oil inclusion body 141 acts evenly on the entire annular oil inclusion body 141 even if a movable load vertically acts on the strut-type suspension in a regionally biased manner around the axial center AX of the piston rod while the vehicle is running.

Furthermore, the load receiving surface 141a in an annular convex shape is formed on the upper end of the annular oil inclusion body 141 so as to upwardly project from the upper case top surface 111a of the upper case 110 to come into contact with the vehicle-side attaching member VA for receiving a movable load.

With this configuration, the load receiving surface 141a is displaced by receiving a movable load from the vehicle-side attaching member VA on the whole surface in an unbiased manner thereof without being in contact with peripheral members.

Also, in the present embodiment, the hydraulic load sensor 140 is connected via a connector 143 to a controller CT that controls a brake of the vehicle by receiving an output signal from the hydraulic load sensor 140.

The controller CT is configured, for example, to increase the braking force of the brake in accordance with the amount of a movable load that vertically acts on the strut-type suspension when a driver of the vehicle manipulates the brake.

With this configuration, the braking force of the brake manipulated by the driver is made larger as the movable load acting on the strut-type suspension becomes larger.

The controller CT includes an arithmetic unit such as a CPU, and may be integrated with the hydraulic load sensor 140 at the interior of the upper case 110.

Also, in the present embodiment, the hydraulic load sensor 140 is connected via a communication circuit to a load amount manager AD that manages a load amount of the vehicle by receiving an output signal from the hydraulic load sensor 140.

The load amount manager AD is configured to manage the load amount of each vehicle online.

With this configuration, information about the load amount of each vehicle is gathered in a control center of a carrying company, for example.

Also, in the present embodiment, the hydraulic load sensor 140 is connected via the connector 143 to the controller CT that controls at least either a damping force of the shock absorber or a spring rate of an air suspension by receiving an output signal from the hydraulic load sensor 140.

The controller CT is configured, for example, to increase at least either the damping force or the spring rate in accordance with the amount of a movable load vertically acting on the strut-type suspension.

With this configuration, the damping force or the spring rate is increased as the amount of a movable load increases for receiving the increase of the movable load.

Also, in the present embodiment, the hydraulic load sensor 140 is connected via the connector 143 to the controller CT that controls at least either a damping force of the shock absorber or a spring rate of an air suspension by receiving an output signal from the hydraulic load sensor 140 to monitor longitudinal and lateral balances of the vehicle.

The controller CT is configured to increase at least either the damping force or the spring rate in accordance with longitudinal and lateral differences between the amounts of a vertically acting movable load measured by each strut-type suspension of the vehicle so that the tilt of the vehicle is reduced. For example, the controller CT increases the damping force or the spring rate in a left, right, front, or rear strut-type suspension that is burdened with a larger movable load.

With this configuration, the tilt of the vehicle is reduced.

When the lateral or longitudinal difference between the amounts of the movable loads measured by four hydraulic load sensors 140 corresponding to four wheels of the vehicle exceeds a predetermined allowable value, then an alert may be displayed on a display panel in a cockpit of the vehicle or an alarm may be rung for notifying the driver of the vehicle that the loading positions of goods should be changed.

In this case, if the notification is given so as to instruct the driver to move a part or the whole of the goods from a position where the largest amount of the movable load is detected to a position where the smallest amount of the movable load is detected, then the driver can easily balance the movable load longitudinally and laterally.

Also, in the present embodiment, the hydraulic load sensor 140 is connected via the connector 143 to the controller CT that actively controls a damping force of the shock absorber by receiving an output signal from the hydraulic load sensor 140 to monitor an input load from a tire (suspension).

With this configuration, the damping force can be reduced when the vehicle exits a paved road and enters a rough load such as an unpaved road, for example, to receive the input load in a temporally distributed manner.

The hydraulic load sensor may have any shape, as long as a movable load vertically acting on the strut-type suspension can be precisely measured.

Also, the hydraulic load sensor may be any type, such as a semiconductor piezoresistance diffusion pressure sensor and a capacitance pressure sensor, as long as the hydraulic load sensor measures a pressure of liquid with a pressure-sensitive element via a diaphragm (such as a stainless diaphragm and a silicon diaphragm), converts the pressure to an electric signal, and outputs the electric signal.

A semiconductor piezoresistance diffusion pressure sensor has a semiconductor strain gage formed on the surface of the diaphragm and converts a change in electric resistance caused by a piezoresistance effect created by deformation of the diaphragm due to an external force (pressure) to an electric signal.

A capacitance-type pressure sensor forms a capacitor by opposing a glass fixed electrode to a silicon movable electrode and converts a change in capacitance caused by deformation of the movable electrode due to an external force (pressure) to an electric signal.

The liquid as a pressure detection medium of the hydraulic load sensor may be anything, such as oil and water, as long as the liquid enables precise measurement of the load.

As described above, the thrust bearing 100 as a thrust bearing for a vehicle of the first embodiment of the present invention includes the hydraulic load sensor 140 as a hydraulic load sensor for measuring a movable load, or a load vertically acting on a strut-type suspension. The hydraulic load sensor 140 may be provided in the upper case 110, the lower case 120, or the sliding bearing piece 130, and is provided in the upper case 110 in this particular case. Thus, it is possible to precisely measure a movable load vertically acting on the strut-type suspension of each wheel while the vehicle is running.

Also, because the hydraulic load sensor 140 includes the annular oil inclusion body 141 as an annular liquid inclusion body that receives a movable load vertically acting on the strut-type suspension and the pressure/signal converter 142 that is connected to the annular oil inclusion body 141 and converts the pressure of the oil OL in the annular oil inclusion body 141 to a signal, and the annular oil inclusion body 141 is arranged concentrically with respect to the axial center AX of the piston rod, which is concentric with the axial center of the thrust bearing 100, it is possible to precisely measure the load.

Also, because the annular oil inclusion body 141 is mounted in the annular concavity 111aa, or an annular concave portion provided on the upper case top surface 111a of the upper case 110, and the load receiving surface 141a is formed at the upper end of the annular oil inclusion body 141 so as to upwardly project from the upper case top surface 111a of the upper case 110 to come into contact with the vehicle-side sitting surface VA1 of the vehicle-side attaching member VA, or a vehicle body-side attaching portion, for receiving a movable load, it is possible to more precisely measure a movable load vertically acting on each strut-type suspension.

Also, because the hydraulic load sensor 140 is connected to the controller CT that controls a brake of the vehicle by receiving an output signal from the hydraulic load sensor 140, and the controller CT controls a braking force of the brake in accordance with the amount of a movable load that vertically acts on the strut-type suspension when a driver of the vehicle manipulates the brake, it is possible to stably decelerate the vehicle even when the load amount of the vehicle changes and to reduce the difference of a braking distance between various load amounts of the vehicle.

Also, because the hydraulic load sensor 140 is connected via a communication circuit to the load amount manager AD that manages a load amount of the vehicle by receiving an output signal from the hydraulic load sensor 140, and the load amount manager AD manages the load amount of each vehicle online, the control center of the carrying company can comprehend the current load amount of each vehicle, for example, to efficiently give each vehicle an instruction for collecting goods.

Also, because the hydraulic load sensor 140 is connected to the controller CT that controls at least either a damping force of the shock absorber or a spring rate of an air suspension by receiving an output signal from the hydraulic load sensor 140, and the controller CT controls at least either the damping force or the spring rate in accordance with the amount of a movable load, it is possible, for example, to increase the damping force or the spring rate as the amount of the movable load increases to ensure the running stability of the vehicle even when the load amount of the vehicle changes.

Also, because the hydraulic load sensor 140 is connected to the controller CT that controls at least either a damping force of the shock absorber or a spring rate of an air suspension by receiving an output signal from the hydraulic load sensor 140 to monitor longitudinal and lateral balances of the vehicle, and the controller CT controls at least either the damping force or the spring rate in accordance with longitudinal and lateral differences between the amounts of a vertically acting movable load measured by each strut-type suspensions of the vehicle so that the tilt of the vehicle is reduced, the damping force or the spring rate can be increased in a left, right, front, or rear strut-type suspension that is burdened with a larger movable load, for example, to control the posture of the vehicle even when the center of gravity of the movable load deviates from the center of the vehicle to ensure the running stability of the vehicle.

Also, because the hydraulic load sensor 140 is connected to a controller CT that actively controls a damping force of the shock absorber by receiving an output signal from the hydraulic load sensor 140 to monitor an input load from a tire, the damping force can be reduced when the vehicle enters a rough load, for example, to ensure the running stability of the vehicle.

Second Embodiment

A thrust bearing 200 as a thrust bearing for a vehicle of the second embodiment of the present invention will now be described in accordance with FIGS. 5 to 8.

Figure 5A:
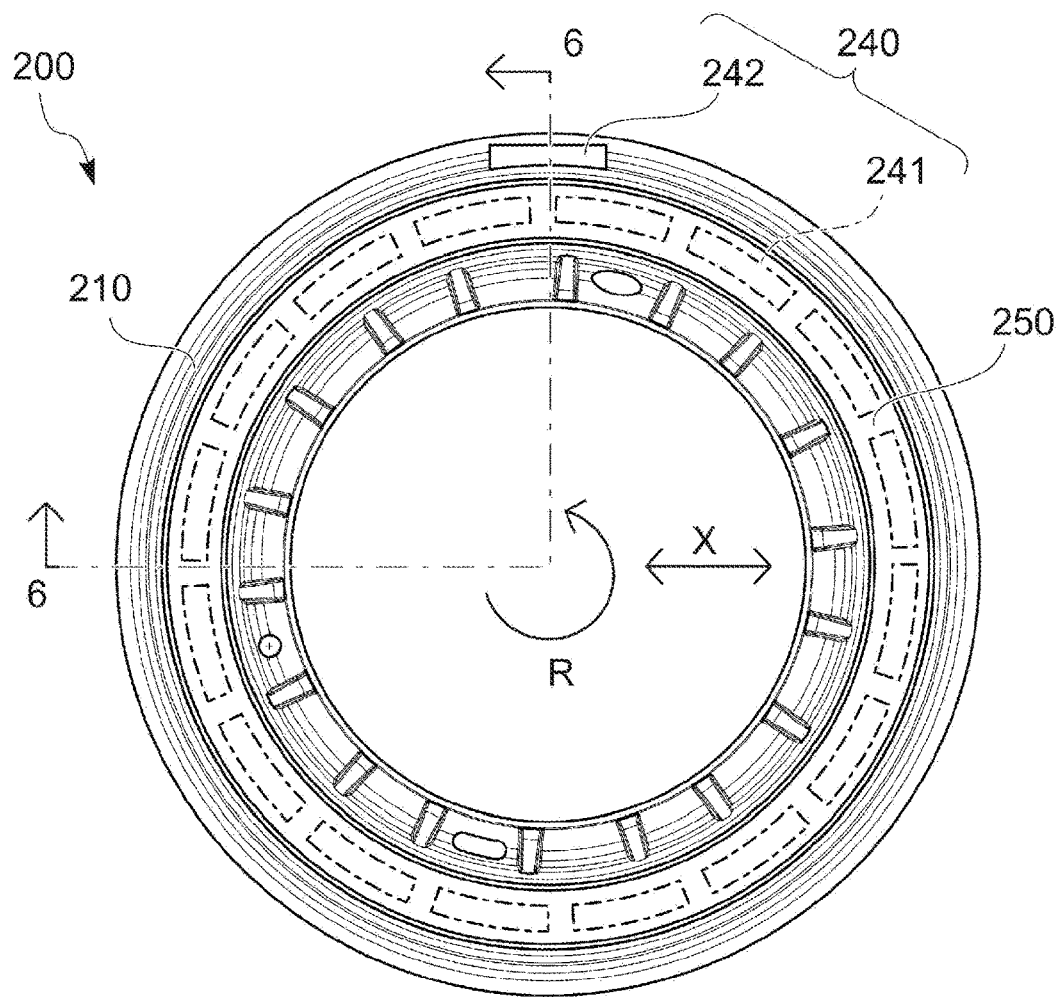
FIGS. 5(A) and 5(B) are top and side views of a thrust bearing for a vehicle as a second embodiment of the present invention.
Figure 5B:
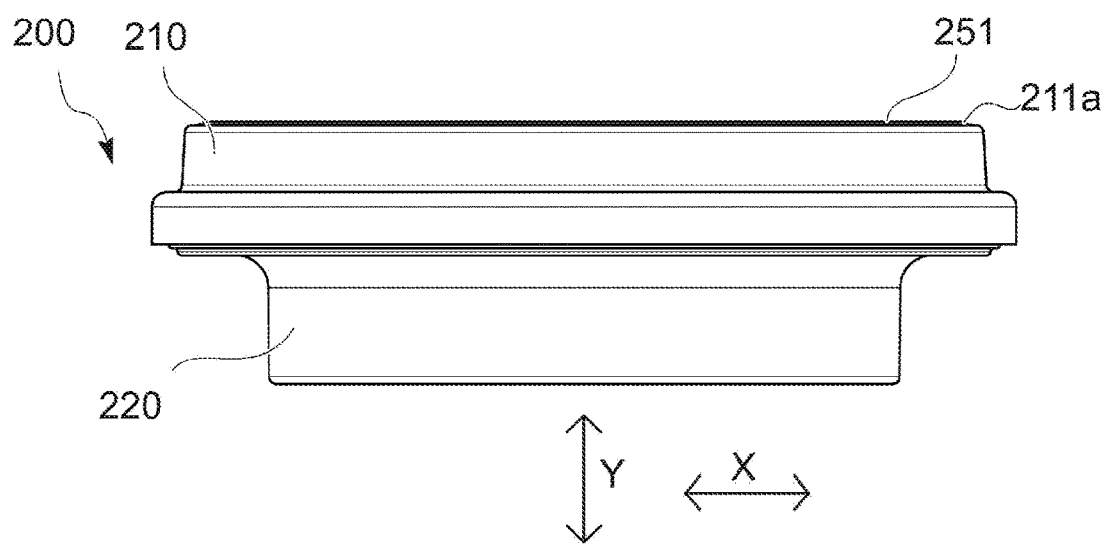
Figure 6:
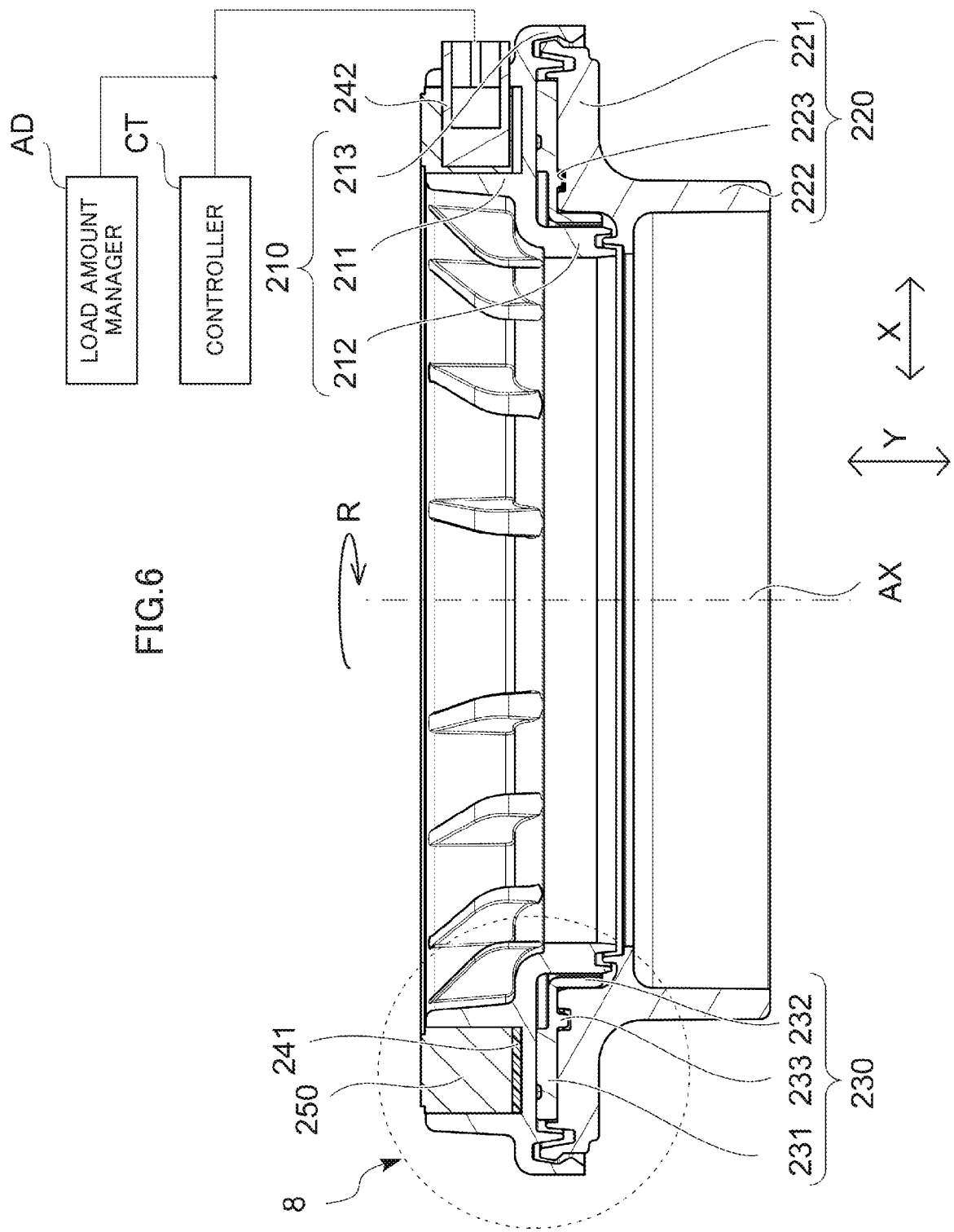
FIG. 6 is a cross-sectional view as seen along line 6-6 illustrated in FIG. 1(A).
Figure 7:
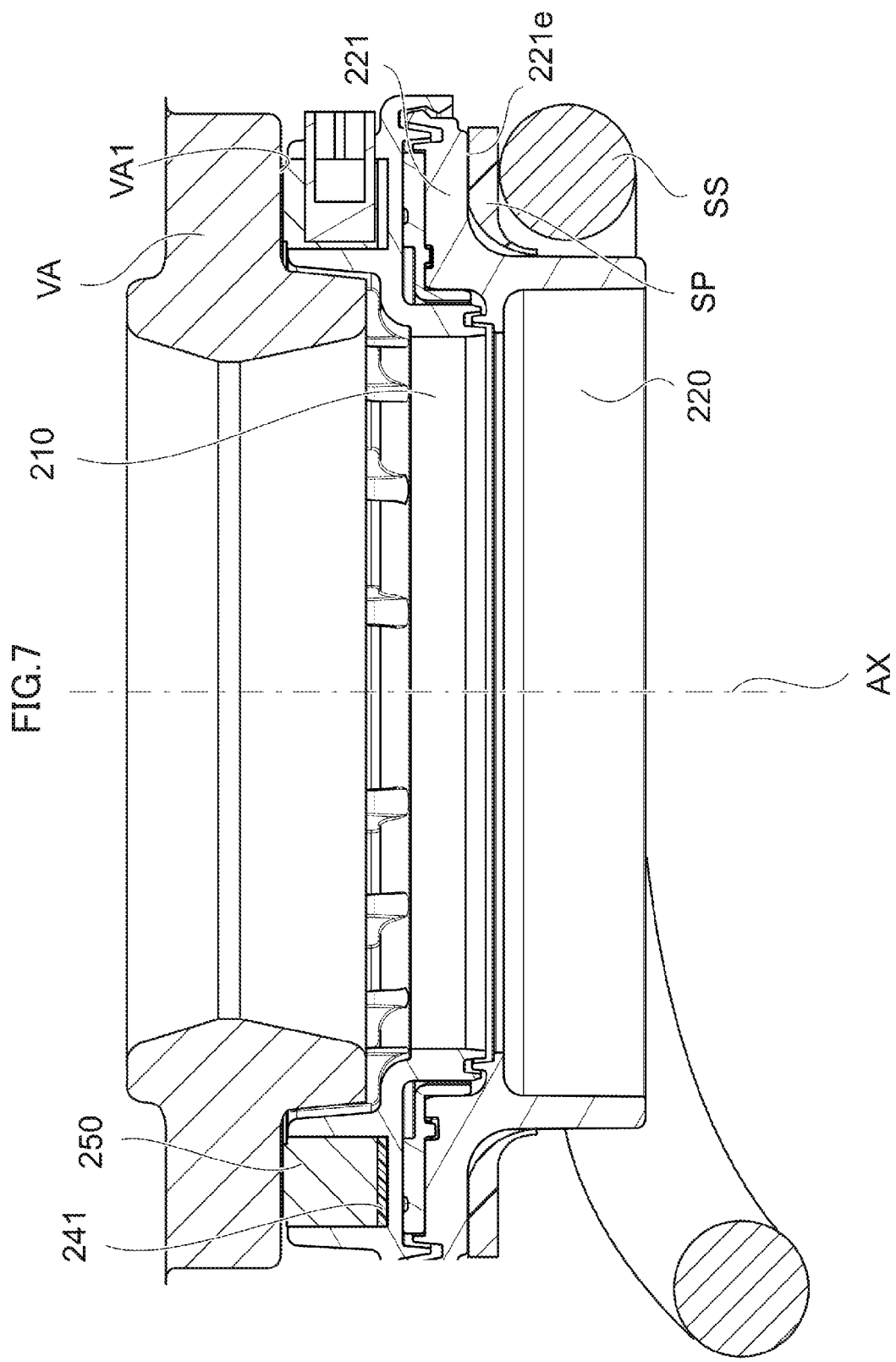
FIG. 7 is a cross-sectional view of the thrust bearing for a vehicle of the second embodiment of the present invention incorporated into a strut-type suspension.
Figure 8:
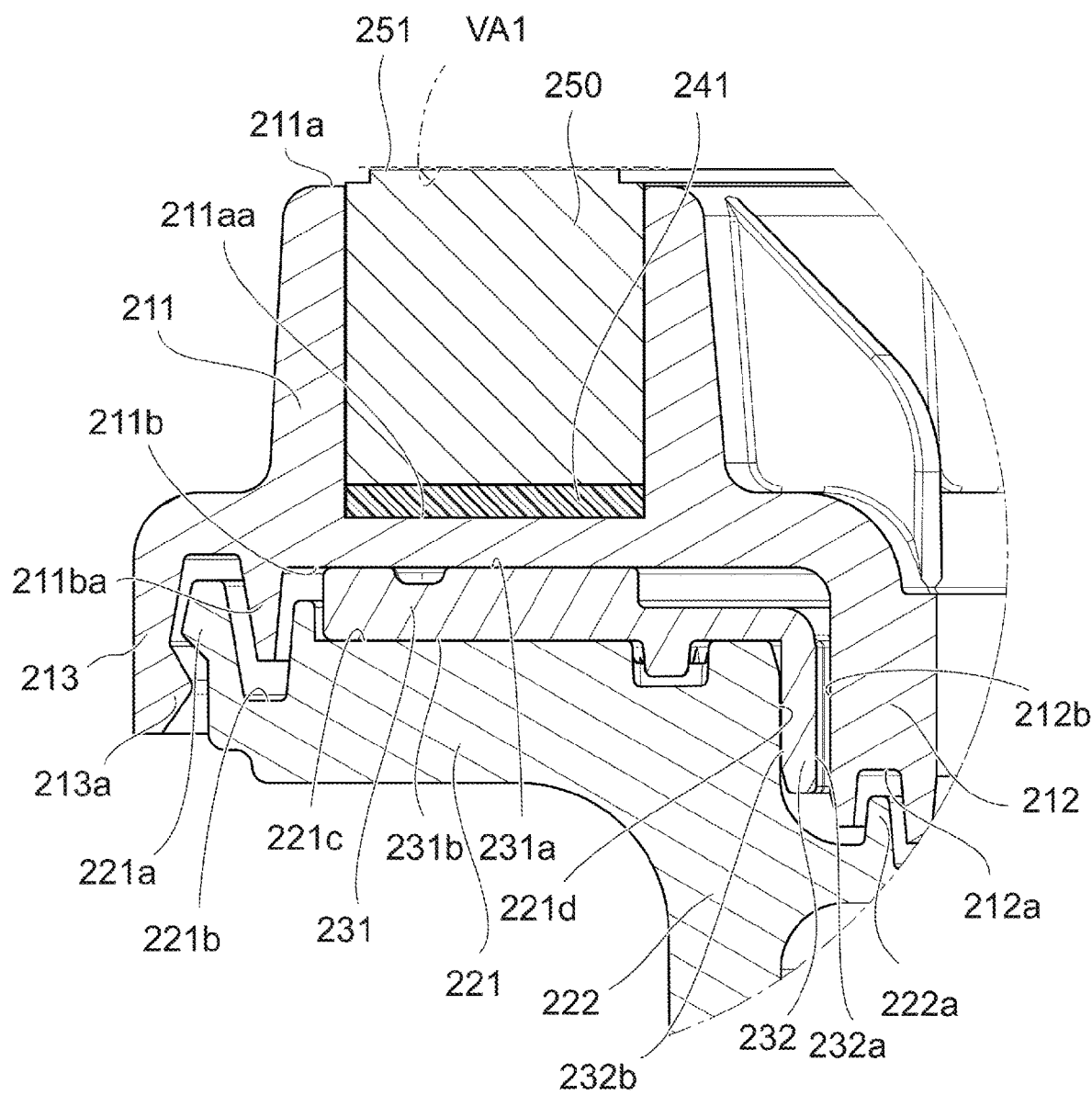
FIG. 8 is an enlarged cross-sectional view of the portion represented with reference numeral 8 in FIG. 6.

FIG. 5(A) is a top view of the thrust bearing 200 for a vehicle as the second embodiment of the present invention. FIG. 5(B) is a side view as seen in a direction represented with reference numeral 5B in FIG. 5(A). FIG. 6 is a cross-sectional view as seen along line 6-6 illustrated in FIG. 5(A). FIG. 7 is a cross-sectional view of the thrust bearing 200 for a vehicle as the second embodiment of the present invention incorporated into a strut-type suspension. FIG. 8 is an enlarged cross-sectional view of the portion represented with reference numeral 8 in FIG. 6.

As shown in FIGS. 5(A) to 8, the thrust bearing 200 for a vehicle as the second embodiment of the present invention includes an upper case 210 made of synthetic resin, a lower case 220 made of synthetic resin, and a sliding bearing piece 230 as a bearing piece made of synthetic resin.

The upper case 210 is configured to abut against a vehicle-side attaching member VA, or a vehicle body-side attaching portion.

In the present embodiment, the upper case 210 integrally includes an annular upper case base 211 that is mounted on the vehicle and forms an annular upper case top surface 211a and an annular upper case bottom surface 211b along an axial direction Y of a piston rod, an inner circumferential-side cylindrical portion 212 that downwardly extends from an inner circumferential end in a radial direction X of the upper case base 211, and an outer circumferential cylindrical portion 213 that downwardly extends from an outer circumferential end in the radial direction X of the upper case base 211.

An annular concavity 211aa as a concave portion is formed on the upper case top surface 211a of the upper case base 211. A film layer 241 of a film-type load sensor 240, which will be described later, is arranged on the bottom of the annular concavity 211aa.

Also, a spacing member 250 is provided on top of the film layer 241 in the annular concavity 211aa.

The upper case 210 is provided on the lower case 220 so that the lower case 220 is rotatable with respect to the upper case 210 about an axial center AX of the piston rod.

In the present embodiment, the lower case 220 integrally includes an annular lower case base 221 on which the upper case 210 is provided so that the lower case base 221 is rotatable with respect to the upper case 210 about the axial center AX, and an inner circumferential-side cylindrical portion 222 that downwardly extends from a radial inner side of the lower case base 221.

An inner annular engaging claw 221a is formed on a radial outer side of the lower case base 221. The inner annular engaging claw 221a engages with an outer annular engaging claw 213a formed on an outer circumference-side cylindrical portion 213 of the upper case 210 so as to be rotatable in a circumferential direction R.

An outer annular engaging groove 221b is formed radially inward of the inner annular engaging claw 221a of the lower case base 221. The outer annular engaging groove 221b engages, via a small gap, with an outer annular engaging ridge 211ba formed on the upper case bottom surface 211b of the upper case base 211.

This prevents an extraneous substance from entering an annular space formed between the upper case 210 and the lower case 220 from radial outside of the annular space.

An inner annular engaging ridge 222a is formed inward of the inner circumferential-side cylindrical portion 222 of the lower case 220. The inner annular engaging ridge 222a engages, via small gap, with an inner annular engaging groove 212a formed on a lower end of the inner circumferential-side cylindrical portion 212 of the upper case 210.

This prevents an extraneous substance from entering the annular space formed between the upper case 210 and the lower case 220 from radial inside of the annular space.

The sliding bearing piece 230 exists in the annular space formed between the upper case 210 and the lower case 220 for receiving a thrust load of the piston rod.

In the present embodiment, the sliding bearing piece 230 is arranged in an annular space between the upper case bottom surface 211b of the upper case base 211 and the lower case top surface 221c of the lower case base 221 and in an annular space between an outer circumferential surface 212b of the inner circumference-side cylindrical portion 212 and an inner circumferential surface 221d of the lower case base 221.

The sliding bearing piece 230 includes an annular thrust sliding bearing piece portion 231, a cylindrical radial sliding bearing piece portion 232, and an anti-rotation convex portion 233 downwardly projecting from the thrust sliding bearing piece portion 231.

The thrust sliding bearing piece portion 231 includes a bearing top surface 231a that slidably contacts with the upper case bottom surface 211b of the upper case base 211, and a bearing bottom surface 231b that contacts with the lower case top surface 221c of the lower case base 221 of the lower case 220.

On the other hand, the radial sliding bearing piece portion 232 includes a bearing inner circumferential surface 232a that slidably contacts with the outer circumferential surface 212b of the inner circumference-side cylindrical portion 212 of the upper case 210, and an outer circumferential surface 232b that contacts with the inner circumferential surface 221d of the lower case base 221 of the lower case 220.

The anti-rotation convex portion 233 engages with an anti-rotation concave portion 223 formed on the lower case top surface 221c of the lower case 220 to restrict the rotation of the sliding bearing piece 230 with respect to the lower case 220.

In the present embodiment, as one example, the anti-rotation convex portion 233 and the anti-rotation concave portion 223 are provided to prevent the sliding bearing piece 230 from rotating with respect to the lower case 220. Alternatively, the anti-rotation convex portion 233 and the anti-rotation concave portion 223 may not be provided so that the sliding bearing piece 230 can rotate with respect to the lower case 220.

As shown in FIG. 7, a spring pad SP made of rubber in an annular shape is provided on a lower case bottom surface 221e of the lower case base 221.

The thrust bearing 200 is incorporated into a strut-type (McPherson) suspension so as to be arranged between a vehicle-side sitting surface VA1 of the vehicle-side attaching member VA and a coil spring SS, wherein a spacing member top surface 251, which is at least a part of the spacing member 250 on a top surface side thereof provided in the annular concavity 211aa of the upper case 210, abuts against the vehicle-side sitting surface VA1 of the vehicle-side attaching member VA, as described later, and the spring pad SP abuts against an upper end portion of the coil spring SS.

In the present embodiment, a film-type load sensor 240 for measuring a movable load vertically acting on the strut-type suspension is provided in the annular concavity 211aa of the upper case 210, for example. Alternatively, the film-type load sensor 240 may be provided in the lower case 220.

With this configuration, a movable load acts on the film-type load sensor 240 in each strut-type suspension mounted on a vehicle such as an automobile and a truck.

Specifically, the film-type load sensor 240 includes a film layer 241 that deforms in accordance with the amount of a movable load vertically acting on the strut-type suspension.

Furthermore, the electric resistance of the film layer 241 varies in accordance with the amount of the deformation due to the movable load vertically acting on the strut-type suspension.

With this configuration, the value of electric current flowing through the film layer 241 varies in accordance with the amount of the movable load vertically acting on the suspension.

Also, in the present embodiment, the film layer 241 is arranged on the bottom of the annular concavity 211aa provided as a concave portion on the upper case top surface 211a of the upper case 210.

Furthermore, a space member 250 is provided on top of the film layer 241 in the annular concavity 211aa.

The spacing member top surface 251, which is at least a part of the spacing member 250 on a top surface side thereof, upwardly projects from the upper case top surface 211a of the upper case 210 to come into contact with the vehicle-side attaching member VA.

With this configuration, a movable load of the vehicle acts on the film layer 241 via the spacing member 250 with little interference from other members.

Also, in the present embodiment, a plurality of the film layers 241 are arranged in a circumferential direction of the piston rod.

The total electric resistance of the plurality of the film layers 241 is used as a value of the movable load vertically acting on the strut-suspension.

With this configuration, the bias of the movable load in the circumferential direction does not affect the value of the movable load.

Also, in the present embodiment, the film-type load sensor 240 is connected via a connector 242 to a controller CT that controls a brake of the vehicle by receiving an output signal from the film-type load sensor 240.

The controller CT is configured, for example, to increase the braking force of the brake in accordance with the amount of a movable load that vertically acts on the strut-type suspension when a driver of the vehicle manipulates the brake.

With this configuration, the braking force of the brake manipulated by the driver is made larger as the movable load acting on the strut-type suspension becomes larger.

The controller CT includes an arithmetic unit such as a CPU, and may be integrated with the film-type load sensor 240 at the interior of the upper case 210.

Also, in the present embodiment, the film-type load sensor 240 is connected via a communication circuit to a load amount manager AD that manages a load amount of the vehicle by receiving an output signal from the film-type load sensor 240.

The load amount manager AD is configured to manage the load amount of each vehicle online.

With this configuration, information about the load amount of each vehicle is gathered in a control center of a carrying company, for example.

Also, in the present embodiment, the film-type load sensor 240 is connected via the connector 242 to the controller CT that controls at least either a damping force of the shock absorber or a spring rate of an air suspension by receiving an output signal from the film-type load sensor 240.

The controller CT is configured, for example, to increase at least either the damping force or the spring rate in accordance with the amount of a movable load vertically acting on the strut-type suspension.

With this configuration, the damping force or the spring rate is increased as the amount of the movable load increases for receiving the increase of the movable load.

Also, in the present embodiment, the film-type load sensor 240 is connected via the connector 242 to the controller CT that controls at least either a damping force of the shock absorber or a spring rate of an air suspension by receiving an output signal from the film-type load sensor 240 to monitor longitudinal and lateral balances of the vehicle.

The controller CT is configured to increase at least either the damping force or the spring rate in accordance with longitudinal and lateral differences between the amounts of a vertically acting movable load measured by each strut-type suspension of the vehicle so that the tilt of the vehicle is reduced. For example, the controller CT increases the damping force or the spring rate in a left, right, front, or rear strut-type suspension that is burdened with a larger movable load.

With this configuration, the tilt of the vehicle is reduced.

When the lateral or longitudinal difference between the amounts of the movable loads measured by four film-type load sensors 240 corresponding to four wheels of the vehicle exceeds a predetermined allowable value, then an alert may be displayed on a display panel in a cockpit of the vehicle or an alarm may be rung for notifying the driver of the vehicle that the loading positions of goods should be changed.

In this case, if the notification is given so as to instruct the driver to move a part or the whole of the goods from a position where the largest amount of the movable load is detected to a position where the smallest amount of the movable load is detected, then the driver can easily balance the movable load longitudinally and laterally.

Also, in the present embodiment, the film-type load sensor 240 is connected via the connector 242 to the controller CT that actively controls a damping force of the shock absorber by receiving an output signal from the film-type load sensor 240 to monitor an input load from a tire (suspension).

With this configuration, the damping force can be reduced when the vehicle exits a paved road and enters a rough load such as an unpaved road, for example, to receive the input load in a temporally distributed manner.

The film-type load sensor may have any shape, as long as a movable load vertically acting on the strut-type suspension can be precisely measured.

Also, the film-type load sensor may be any type, such as an electrode resistance sensor, a piezofilm sensor, and a variable capacitance sensor, as long as the film layer deforms due to an external force (pressure) and the electric resistance and voltage of the film layer thus varies.

The electric resistance or voltage may be configured to either increase or decrease as the pressure becomes larger, as long as the correspondence relationship between the amount of the pressure and the amount of the electric resistance or voltage is unambiguously defined.

The electrode resistance sensor includes an electrode and a carbon sheet, for example, such that a gap is created between the electrode and the carbon sheet. When a pressure is applied, the electrode comes into contact with the carbon sheet and the electric resistance thus changes. As the pressure changes, the electric resistance also changes because the area of contact between the electrode and the carbon sheet changes.

Alternatively, the electrode resistance sensor may include two films on which rows and columns of silver electrodes are respectively arranged and covered with pressure-sensitive conductive ink for detecting not only the amount of pressure but also the distribution of pressure.

The piezofilm sensor has a configuration in which a piezo in the film layer deforms due to a pressure to convert the pressure to voltage, which varies in accordance with a change in the pressure.

The variable capacitance sensor has two electrodes that confront each other and forma capacitor in the film layer such that the electric resistance varies as the distance between the two electrodes changes due to the fluctuation of a pressure.

As described above, the thrust bearing 200 as a thrust bearing for a vehicle of the second embodiment of the present invention includes the film-type load sensor 240 for measuring a movable load vertically acting on a strut-type suspension, the film-type load sensor 240 being provided in the upper case 210, the lowercase 220, or the sliding bearing piece 230. Thus, it is possible to precisely measure a movable load vertically acting on the strut-type suspension of each wheel while the vehicle is running.

Also, because the film-type load sensor 240 includes the film layer 241 that receives a movable load vertically acting on the strut-type suspension and the electric resistance of the film layer 241 varies in accordance with the amount of the deformation due to the movable load vertically acting on the strut-type suspension, it is possible to precisely measure the movable load by simply measuring the value of electric current flowing through the film layer 241

Also, because the film layer 241 is arranged on the bottom of the annular concavity 211aa as a concave portion provided on the upper case top surface 211a of the upper case 210, and the spacing member top surface 251, which is at least a part of the spacing member 250 on a top surface side thereof, upwardly projects from the upper case top surface 211a of the upper case 210 to come into contact with the vehicle-side attaching member VA, or a vehicle body-side attaching portion, it is possible to more precisely measure a movable load vertically acting on each suspension.

Also, because a plurality of the film layers 241 are arranged in the circumferential direction of the piston rod, and the total electric resistance of the plurality of the film layers 241 is used as a value of the movable load vertically acting on the strut-suspension, it is possible to more precisely measure the movable load of the vehicle acting on each strut-type suspension.

Also, because the film-type load sensor 240 is connected to the controller CT that controls a brake of the vehicle by receiving an output signal from the film-type load sensor 240, and the controller CT controls a braking force of the brake in accordance with the amount of a movable load that vertically acts on the strut-type suspension when a driver of the vehicle manipulates the brake, it is possible to stably decelerate the vehicle even when the load amount of the vehicle changes and to reduce the difference of a braking distance between various load amounts of the vehicle.

Also, because the film-type load sensor 240 is connected via a communication circuit to the load amount manager AD that manages a load amount of the vehicle by receiving an output signal from the film-type load sensor 240, and the load amount manager AD manages the load amount of each vehicle online, the control center of the carrying company can comprehend the current load amount of each vehicle, for example, to efficiently give each vehicle an instruction for collecting goods.

Third Embodiment

A thrust bearing 300 as a thrust bearing for a vehicle of the third embodiment of the present invention will now be described in accordance with FIGS. 9 to 13.

Figure 9A:
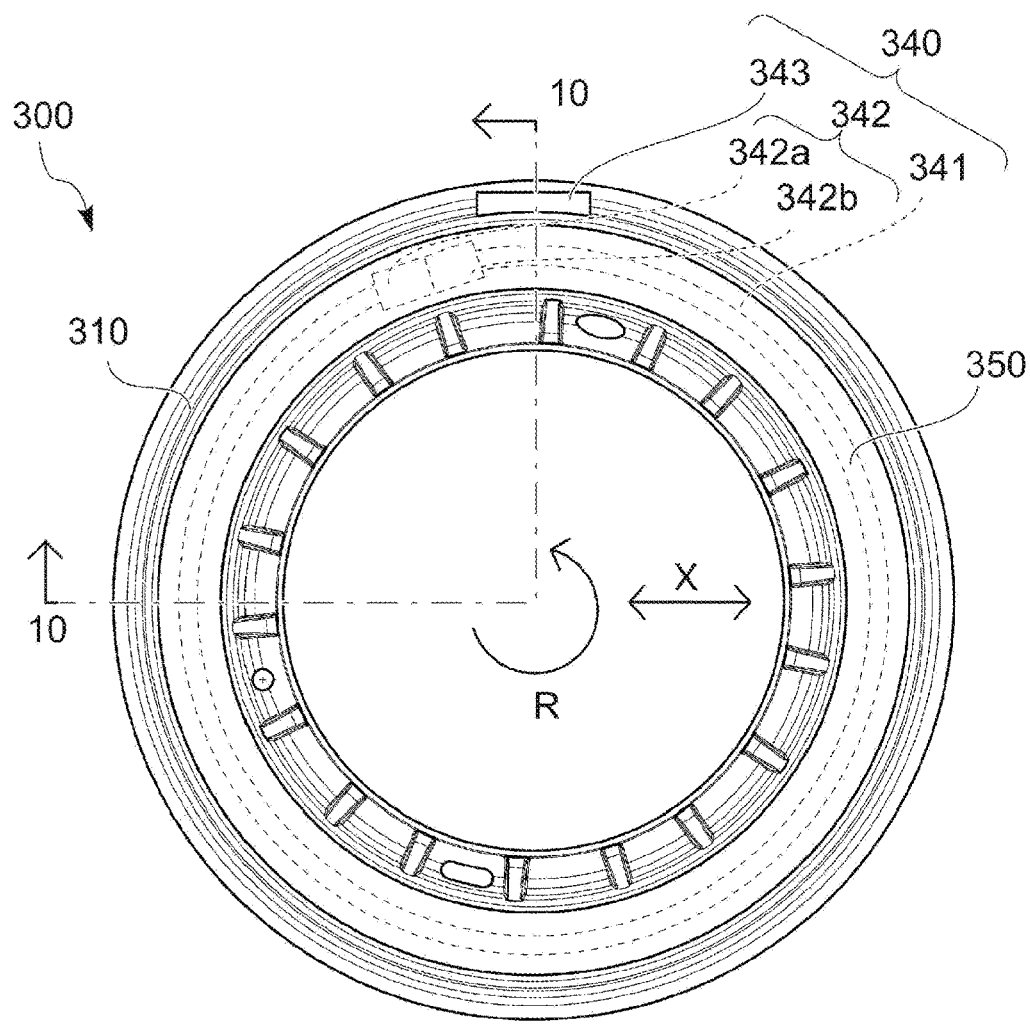
FIGS. 9(A) and 9(B) are top and side views of a thrust bearing for a vehicle as a third embodiment of the present invention.
Figure 9B:
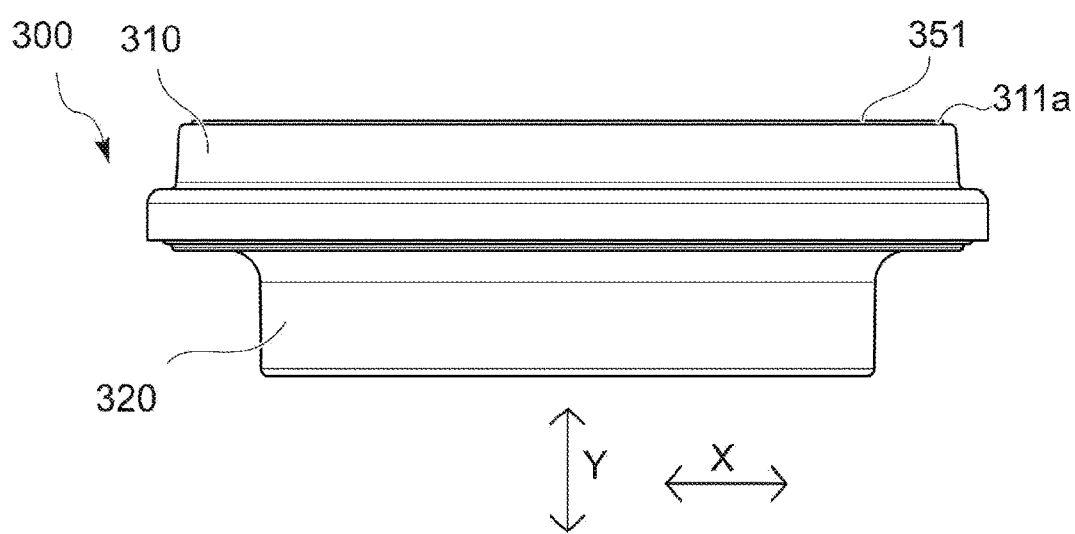
Figure 10:
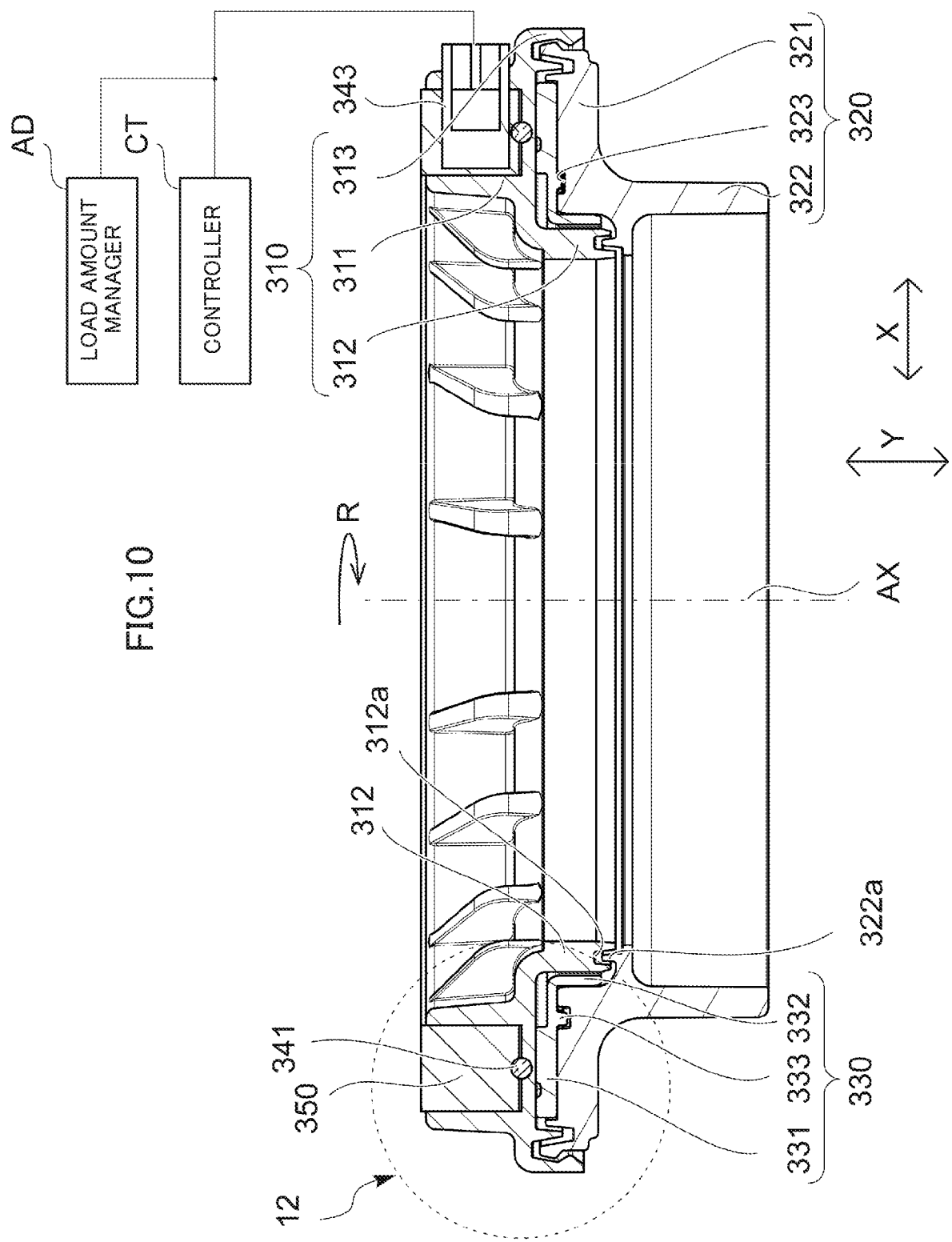
FIG. 10 is a cross-sectional view as seen along line 10-10 illustrated in FIG. 9(A).
Figure 11:
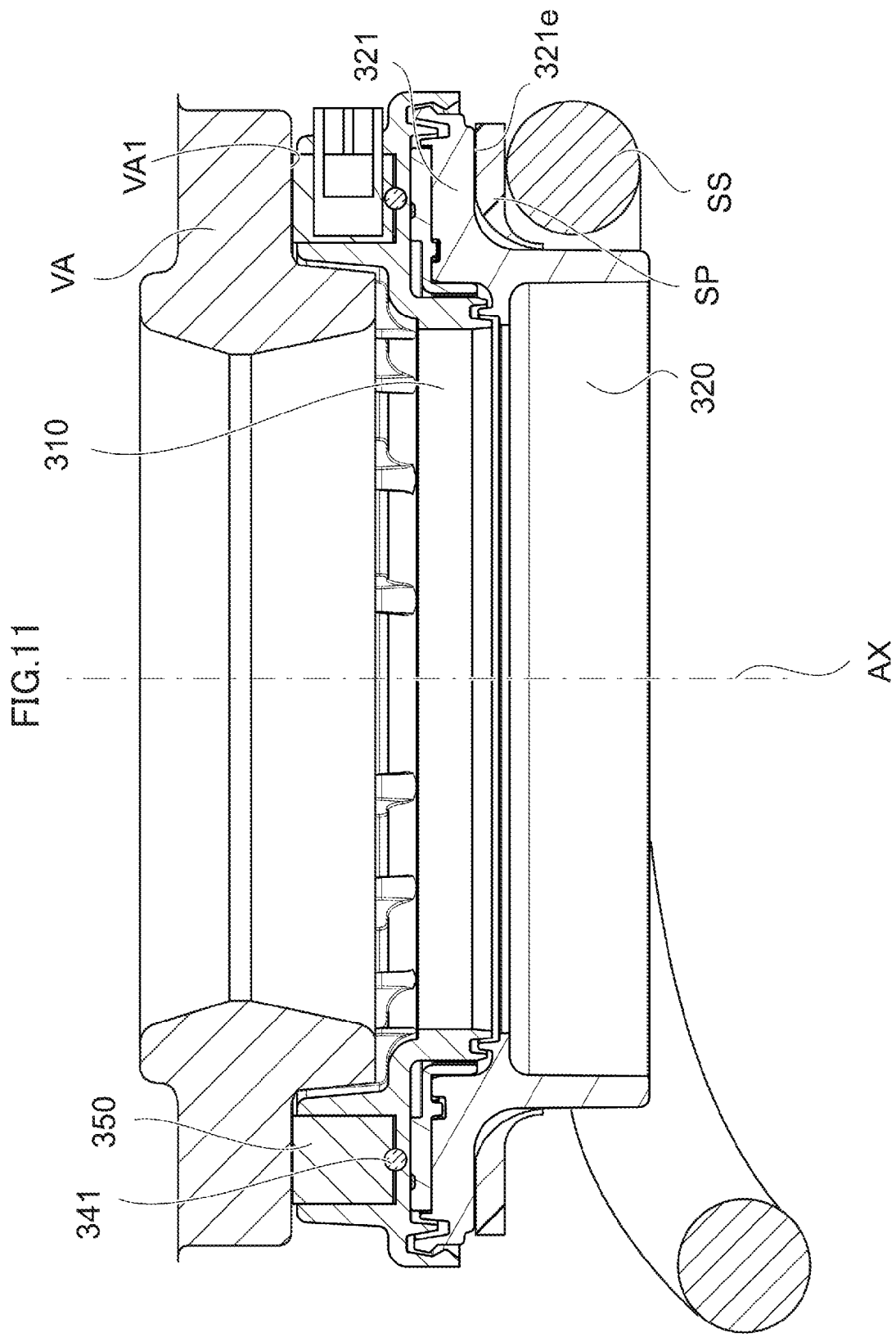
FIG. 11 is a cross-sectional view of the thrust bearing for a vehicle of the third embodiment of the present invention incorporated into a strut-type suspension.
Figure 12:
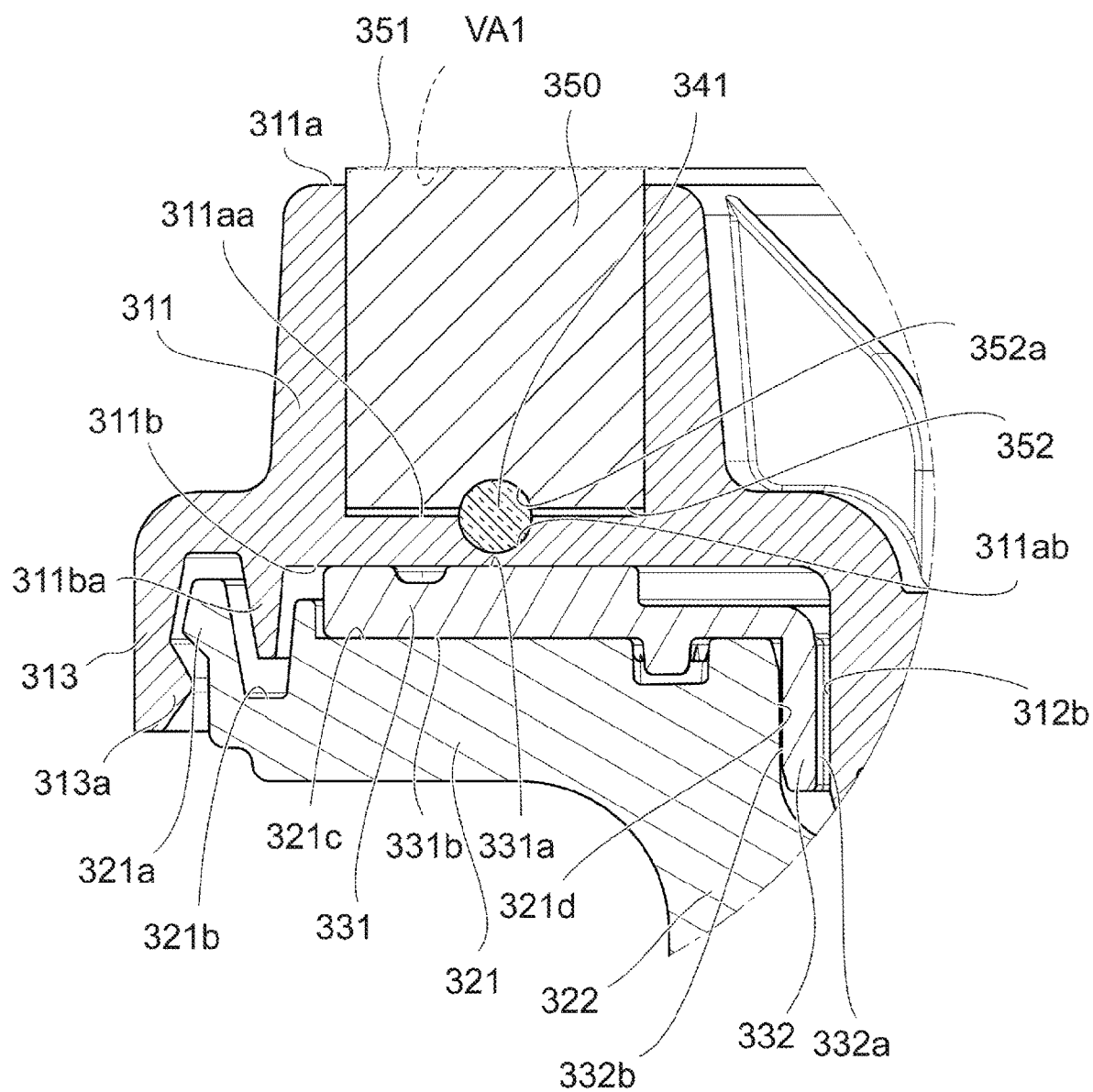
FIG. 12 is an enlarged cross-sectional view of the portion represented with reference numeral 12 in FIG. 10.
Figure 13A:
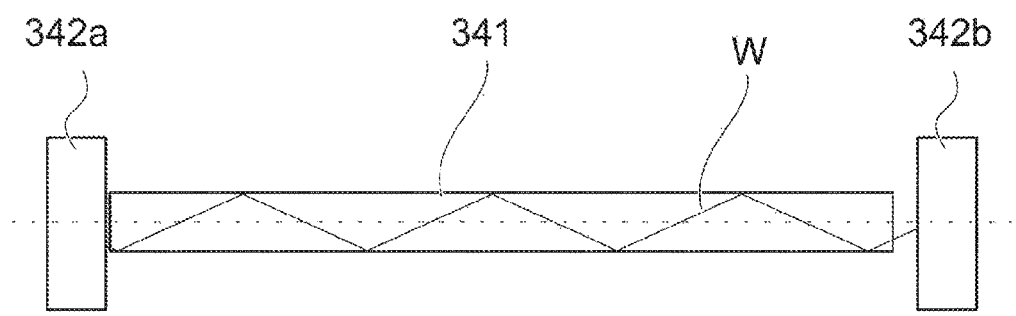
FIGS. 13(A) and 13(B) are diagrams illustrating the principle of operation of an optical fiber-type load sensor.
Figure 13B:
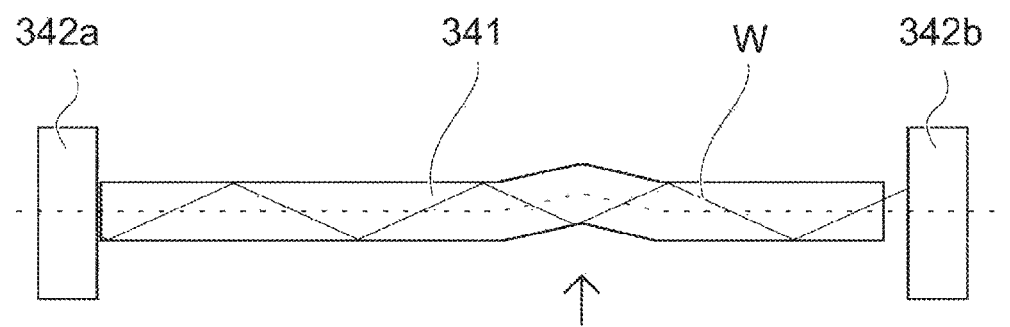

FIG. 9(A) is a top view of the thrust bearing 300 for a vehicle as the third embodiment of the present invention. FIG. 9(B) is a side view as seen in a direction represented with reference numeral 9B in FIG. 9(A). FIG. 10 is a cross-sectional view as seen along line 10-10 illustrated in FIG. 9(A). FIG. 11 is a cross-sectional view of the thrust bearing 300 for a vehicle as the third embodiment of the present invention incorporated into a strut-type suspension. FIG. 12 is an enlarged cross-sectional view of the portion represented with reference numeral 12 in FIG. 10. FIG. 13(A) is a diagram illustrating the principle of operation of an optical fiber-type load sensor 340 when no or a small amount of a movable load is acting. FIG. 13(B) is a diagram illustrating the principle of operation of the optical fiber-type load sensor 340 when a large amount of a movable load is acting.

As shown in FIGS. 9(A) to 12, the thrust bearing 300 for a vehicle as the third embodiment of the present invention includes an upper case 310 made of synthetic resin, a lower case 320 made of synthetic resin, and a sliding bearing piece 330 as a bearing piece made of synthetic resin.

The upper case 310 is configured to abut against a vehicle-side attaching member VA, or a vehicle body-side attaching portion.

In the present embodiment, the upper case 310 integrally includes an annular upper case base 311 that is mounted on the vehicle and forms an annular upper case top surface 311a and an annular upper case bottom surface 311b along an axial direction Y of a piston rod, an inner circumferential-side cylindrical portion 312 that downwardly extends from an inner circumferential end in a radial direction X of the upper case base 311, and an outer circumferential cylindrical portion 313 that downwardly extends from an outer circumferential end in the radial direction X of the upper case base 311.

An annular concavity 311aa as a concave portion is formed on the upper case top surface 311a of the upper case base 311. An annular optical fiber 341 as an optical fiber of an optical fiber-type load sensor 340, which will be described later, is arranged in an upper case-side optical fiber engaging groove 311ab formed on the bottom of the annular concavity 311aa.

Also, a spacing member 350 is provided on top of the annular optical fiber 341 in the annular concavity 311aa.

A spacing member-side optical fiber engaging groove 352a is formed on a spacing member bottom surface 352 of the spacing member 350.

About an upper half of the annular optical fiber 341 engages with the spacing member-side optical fiber engaging groove 352a, and about a lower half of the annular optical fiber 341 engages with the upper case-side optical fiber engaging groove 311ab.

A small gap is created between the spacing member bottom surface 352 and the bottom of the annular concavity 311aa so that a movable load can act on the annular optical fiber 341.

The upper case 310 is provided on the lower case 320 so that the lower case 320 is rotatable with respect to the upper case 310 about an axial center AX of the piston rod.

In the present embodiment, the lower case 320 integrally includes an annular lower case base 321 on which the upper case 310 is provided so that the lower case base 321 is rotatable with respect to the upper case 310 about the axial center AX, and an inner circumferential-side cylindrical portion 322 that downwardly extends from a radial inner side of the lower case base 321.

An inner annular engaging claw 321a is formed on a radial outer side of the lower case base 321. The inner annular engaging claw 321a engages with an outer annular engaging claw 313a formed on an outer circumference-side cylindrical portion 313 of the upper case 310 so as to be rotatable in a circumferential direction R.

An outer annular engaging groove 321b is formed radially inward of the inner annular engaging claw 321a of the lower case base 321. The outer annular engaging groove 321b engages, via a small gap, with an outer annular engaging ridge 311ba formed on the upper case bottom surface 311b of the upper case base 311.

This prevents an extraneous substance from entering an annular space formed between the upper case 310 and the lower case 320 from radial outside of the annular space.

An inner annular engaging ridge 322a is formed inward of the inner circumferential-side cylindrical portion 322 of the lower case 320. The inner annular engaging ridge 322a engages, via small gap, with an inner annular engaging groove 312a formed on a lower end of the inner circumferential-side cylindrical portion 312 of the upper case 310.

This prevents an extraneous substance from entering the annular space formed between the upper case 310 and the lower case 320 from radial inside of the annular space.

The sliding bearing piece 330 exists in the annular space formed between the upper case 310 and the lower case 320 for receiving a thrust load of the piston rod.

In the present embodiment, the sliding bearing piece 330 is arranged in an annular space between the upper case bottom surface 311b of the upper case base 311 and the lower case top surface 321c of the lower case base 321 and in an annular space between an outer circumferential surface 312b of the inner circumference-side cylindrical portion 312 and an inner circumferential surface 321d of the lower case base 321.

The sliding bearing piece 330 includes an annular thrust sliding bearing piece portion 331, a cylindrical radial sliding bearing piece portion 332, and an anti-rotation convex portion 333 downwardly projecting from the thrust sliding bearing piece portion 331.

The thrust sliding bearing piece portion 331 includes a bearing top surface 331a that slidably contacts with the upper case bottom surface 311b of the upper case base 311, and a bearing bottom surface 331b that contacts with the lower case top surface 321c of the lower case base 321 of the lower case 320.

On the other hand, the radial sliding bearing piece portion 332 includes a bearing inner circumferential surface 332a that slidably contacts with the outer circumferential surface 312b of the inner circumference-side cylindrical portion 312 of the upper case 310, and an outer circumferential surface 332b that contacts with the inner circumferential surface 321d of the lower case base 321 of the lower case 320.

The anti-rotation convex portion 333 engages with an anti-rotation concave portion 323 formed on the lower case top surface 321c of the lower case 320 to restrict the rotation of the sliding bearing piece 330 with respect to the lower case 320.

In the present embodiment, as one example, the anti-rotation convex portion 333 and the anti-rotation concave portion 323 are provided to prevent the sliding bearing piece 330 from rotating with respect to the lower case 320. Alternatively, the anti-rotation convex portion 333 and the anti-rotation concave portion 323 may not be provided so that the sliding bearing piece 330 can rotate with respect to the lower case 320.

As shown in FIG. 11, a spring pad SP made of rubber in an annular shape is provided on a lower case bottom surface 321e of the lower case base 321.

The thrust bearing 300 is incorporated into a strut-type (McPherson) suspension so as to be arranged between a vehicle-side sitting surface VA1 of the vehicle-side attaching member VA and a coil spring SS, wherein a spacing member top surface 351, which is at least a part of the spacing member 350 on a top surface side thereof provided in the annular concavity 311aa of the upper case 310, abuts against the vehicle-side sitting surface VA1 of the vehicle-side attaching member VA, as described later, and the spring pad SP abuts against an upper end portion of the coil spring SS.

In the present embodiment, the optical fiber-type load sensor 340 for measuring a movable load vertically acting on the strut-type suspension is provided in the annular concavity 311aa of the upper case 310, for example. Alternatively, the optical fiber-type load sensor 340 may be provided in the lower case 320.

With this configuration, a movable load acts on the optical fiber-type load sensor 340 in each strut-type suspension mounted on a vehicle such as an automobile and a truck.

Specifically, the optical fiber-type load sensor 340 includes a light emitting/receiving portion 342 that integrally forms a light emitting part 342a as a light emitting portion and a light receiving part 342b as a light receiving portion, for example, and the annular optical fiber 341.

The light emitting part 342a is provided at one end in a circumferential direction of the light emitting/receiving portion 342 and is configured to emit light.

The light receiving part 342b is provided at the other end in the circumferential direction of the light emitting/receiving portion 342 and is configured to receive light propagated through the annular optical fiber 341 and measure the phase of the light.

The annular optical fiber 341 is configured to guide light from the light emitting part 342a and to deform in accordance with the amount of a movable load vertically acting on the strut-type suspension.

For example, the annular optical fiber 341 deforms from the state illustrated in FIG. 13(A) to the state illustrated in FIG. 13(B) in accordance with the amount of a movable load.

Thus, the phase or propagation path of a waveform of light W propagated through the annular optical fiber 341 varies in accordance with the deformation of the annular optical fiber 341 due to a movable load vertically acting on the strut-type suspension.

In order to increase the amount of the deformation of the annular optical fiber 341 in accordance with the amount of the movable load, projecting portions that vertically project or inclined portions that are inclined with respect to the circumferential direction of the annular optical fiber 341 may be provided in the upper case-side optical fiber engaging groove 311ab or the spacing member-side optical fiber engaging groove 352a.

When the amount of the movable load decreases, the amount of the deformation of the annular optical fiber 341 also decreases.

Also, in the present embodiment, the annular optical fiber 341 is arranged on the bottom of the annular concavity 311aa provided as a concave portion on the upper case top surface 311a of the upper case 310.

Furthermore, the space member 350 is provided on top of the annular optical fiber 341 in the annular concavity 311aa.

The spacing member top surface 351, which is at least a part of the spacing member 350 on a top surface side thereof, upwardly projects from the upper case top surface 311a of the upper case 310 to come into contact with the vehicle-side attaching member VA.

With this configuration, a movable load of the vehicle acts on the annular optical fiber 341 via the spacing member 350 with little interference from other members.

Also, in the present embodiment, the optical fiber-type load sensor 340 is connected via a connector 343 to a controller CT that controls a brake of the vehicle by receiving an output signal from the optical fiber-type load sensor 340.

The controller CT is configured, for example, to increase the braking force of the brake in accordance with the amount of a movable load that vertically acts on the strut-type suspension when a driver of the vehicle manipulates the brake.

With this configuration, the braking force of the brake manipulated by the driver is made larger as the movable load acting on the strut-type suspension becomes larger.

The controller CT includes an arithmetic unit such as a CPU, and may be integrated with the optical fiber-type load sensor 340 at the interior of the upper case 310.

Also, in the present embodiment, the optical fiber-type load sensor 340 is connected via a communication circuit to a load amount manager AD that manages a load amount of the vehicle by receiving an output signal from the optical fiber-type load sensor 340.

The load amount manager AD is configured to manage the load amount of each vehicle online.

With this configuration, information about the load amount of each vehicle is gathered in a control center of a carrying company, for example.

Also, in the present embodiment, the optical fiber-type load sensor 340 is connected via the connector 343 to the controller CT that controls at least either a damping force of the shock absorber or a spring rate of an air suspension by receiving an output signal from the optical fiber-type load sensor 340.

The controller CT is configured, for example, to increase at least either the damping force or the spring rate in accordance with the amount of a movable load vertically acting on the strut-type suspension.

With this configuration, the damping force or the spring rate is increased as the amount of the movable load increases for receiving the increase of the movable load.

Also, in the present embodiment, the optical fiber-type load sensor 340 is connected via the connector 343 to the controller CT that controls at least either a damping force of the shock absorber or a spring rate of an air suspension by receiving an output signal from the optical fiber-type load sensor 340 to monitor longitudinal and lateral balances of the vehicle.

The controller CT is configured to increase at least either the damping force or the spring rate in accordance with longitudinal and lateral differences between the amounts of a vertically acting movable load measured by each strut-type suspension of the vehicle so that the tilt of the vehicle is reduced. For example, the controller CT increases the damping force or the spring rate in a left, right, front, or rear strut-type suspension that is burdened with a larger movable load.

With this configuration, the tilt of the vehicle is reduced.

When the lateral or longitudinal difference between the amounts of the movable loads measured by four optical fiber-type load sensors 340 corresponding to four wheels of the vehicle exceeds a predetermined allowable value, then an alert may be displayed on a display panel in a cockpit of the vehicle or an alarm may be rung for notifying the driver of the vehicle that the loading positions of goods should be changed.

In this case, if the notification is given so as to instruct the driver to move a part or the whole of the goods from a position where the largest amount of the movable load is detected to a position where the smallest amount of the movable load is detected, then the driver can easily balance the movable load longitudinally and laterally.

Also, in the present embodiment, the optical fiber-type load sensor 340 is connected via the connector 343 to the controller CT that actively controls a damping force of the shock absorber by receiving an output signal from the optical fiber-type load sensor 340 to monitor an input load from a tire (suspension).

With this configuration, the damping force can be reduced when the vehicle exits a paved road and enters a rough load such as an unpaved road, for example, to receive the input load in a temporally distributed manner.

The optical fiber-type load sensor may have any shape, as long as a movable load vertically acting on the strut-type suspension can be precisely measured.

Also, the optical fiber-type load sensor may be any type, such as an FBG (Fiber Bragg Granting) sensor, a scattered light (distribution) sensor, a phase change detection sensor, and a propagation path change detection sensor, as long as an optical fiber is used for measuring a movable load.

The FBG (Fiber Bragg Granting) sensor is a sensor that is microfabricated within an optical fiber. The sensor includes a plurality of layers that have different refractive indices and work as diffraction gratings. The sensor reflects particular wavelengths of light and transmits all others for measuring a stress, distortion, pressure, or the like.

The scattered light (distribution) sensor uses the optical fiber itself as a sensor and measures a longitudinal distortion and the like by detecting the scattered light in the optical fiber.

The phase change detection sensor measures a stress, distortion, pressure, or the like by detecting the change of a phase of a light wavelength, the change being caused by the deformation of the optical fiber due to an external force (pressure).

It does not matter which direction the light wavelength changes in accordance with the amount of the deformation of the optical fiber due to the pressure, as long as the correspondence relationship between the amount of the pressure and the amount of the change of the phase of the light wavelength from a reference position is unambiguously defined.

The propagation path change detection sensor measures a stress, distortion, pressure, or the like by detecting the change of a propagation path of the light propagated through the optical fiber, the change being caused by the deformation of the optical fiber due to an external force (pressure).

As described above, the thrust bearing 300 as a thrust bearing for a vehicle of the third embodiment of the present invention includes the optical fiber-type load sensor 340 for measuring a movable load vertically acting on a strut-type suspension, the optical fiber-type load sensor 340 being provided in the upper case 310, the lower case 320, or the sliding bearing piece 330. Thus, it is possible to precisely measure the movable load vertically acting on the strut-type suspension of each wheel while the vehicle is running.

Also, because the optical fiber-type load sensor 340 includes the light emitting part 342*a* as a light emitting portion, the annular optical fiber 341 as an optical fiber that receives light from the light emitting part 342*a* and deforms in accordance with the amount of a movable load vertically acting on the strut-type suspension, and the light receiving part 342*b* as a light receiving portion that receives the light propagated through the annular optical fiber 341 and measures the phase of the light, and the phase of a waveform of the light propagated through the annular optical fiber 341 changes in accordance with the amount of deformation of the annular optical fiber 341 due to the movable load vertically acting on the strut-type suspension, it is possible to precisely measure the movable load by simply measuring the phase of the waveform.

Also, because the annular optical fiber 341 is arranged on the bottom of the annular concavity 311*aa* as a concave portion provided on the upper case top surface 311*a* of the upper case 310, and the spacing member top surface 351, which is at least a part of the spacing member 350 on a top surface side thereof, upwardly projects from the upper case top surface 311*a* of the upper case 310 to come into contact with the vehicle-side attaching member VA, or a vehicle body-side attaching portion, it is possible to more precisely measure a movable load vertically acting on each strut-type suspension.

Also, because the optical fiber-type load sensor 340 is connected to the controller CT that controls a brake of the vehicle by receiving an output signal from the optical fiber-type load sensor 340, and the controller CT controls a braking force of the brake in accordance with the amount of a movable load that vertically acts on the strut-type suspension when a driver of the vehicle manipulates the brake, it is possible to stably decelerate the vehicle even when the load amount of the vehicle changes and to reduce the difference of a braking distance between various load amounts of the vehicle.

Also, because the optical fiber-type load sensor 340 is connected via a communication circuit to the load amount manager AD that manages a load amount of the vehicle by receiving an output signal from the optical fiber-type load sensor 340, and the load amount manager AD manages the load amount of each vehicle online, the control center of the carrying company can comprehend the current load amount of each vehicle, for example, to efficiently give each vehicle an instruction for collecting goods.

REFERENCE SIGNS LIST 100, 200, 300 thrust bearing for vehicle
110, 210, 310 upper case
111, 211, 311 upper case base
111a, 211a, 311a upper case top surface
111aa, 211aa, 311aa annular concavity (annular concave portion)
311ab upper case-side optical fiber engaging groove
111b, 211b, 311b upper case bottom surface
111ba, 211ba, 311ba outer annular engaging ridge
112, 212, 312 inner circumference-side cylindrical portion
112a, 212a, 312a inner annular engaging groove
112b, 212b, 312b outer circumferential surface
112, 213, 313 outer circumference-side cylindrical portion
113a, 213a, 313a outer annular engaging claw
120, 220, 320 lower case
121, 221, 321 lower case base
121a, 221a, 321a inner annular engaging claw
121b, 221b, 321b outer annular engaging groove
121c, 221c, 321c lower case top surface
121d, 221d, 321d inner circumferential surface
121e, 221e, 321e lower case bottom surface
122, 223, 323 inner circumference-side cylindrical portion
122a, 222a, 322a inner annular engaging ridge
123, 223, 323 anti-rotation concave portion
130, 230, 330 sliding bearing piece (bearing piece)
131, 231, 331 thrust sliding bearing piece portion
131a, 231a, 331a bearing top surface
131b, 231b, 331b bearing bottom surface
132, 232, 332 radial sliding bearing piece portion
132a, 232a, 332a bearing inner circumferential surface
132b, 232b, 332b bearing outer circumferential surface
133, 233, 333 anti-rotation convex portion
140 hydraulic load sensor
141 annular oil inclusion body (annular liquid inclusion body)
141a load receiving surface
142 pressure/signal converter
143 connector
240 film-type load sensor
241 film layer
242 connector
250 spacing member
251 spacing member top surface
340 optical fiber-type load sensor
341 annular optical fiber
342 light emitting/receiving portion
342a light emitting part
342b light receiving part
343 connector
350 spacing member
351 spacing member top surface
352 spacing member bottom surface
352a spacing member-side optical fiber engaging groove
AD load amount manager
AX axial center of piston rod
CT controller
R circumferential direction
SS coil spring
SP spring pad
VA vehicle-side attaching member (vehicle body-side attaching portion)
VA1 vehicle-side sitting surface
X radial direction
Y axial direction

FIGURES

FIG. 2
AD LOAD AMOUNT MANAGER
CT CONTROLLER
FIG. 6
AD LOAD AMOUNT MANAGER
CT CONTROLLER
FIG. 10
AD LOAD AMOUNT MANAGER
CT CONTROLLER

The invention claimed is:

1. A thrust bearing for a vehicle, comprising:
an upper case that abuts against a vehicle body-side attaching portion; and
a lower case on which the upper case is provided so that the lower case is rotatable with respect to the upper case about an axial center of a piston rod used in a shock absorber of a suspension of the vehicle, wherein
the thrust bearing further comprises a hydraulic load sensor for measuring a load vertically acting on the suspension,
wherein the hydraulic load sensor includes:
an annular liquid inclusion body for receiving the load vertically acting on the suspension; and
a pressure/signal converter connected to the annular liquid inclusion body for converting the pressure of a liquid within the annular liquid inclusion body to a signal, and
the annular liquid inclusion body is arranged concentrically with respect to an axial center of the thrust bearing; and
the hydraulic load sensor is located in an annular concave portion provided in a case top surface of the upper case.

2. The thrust bearing for a vehicle according to claim 1, wherein an annular bearing piece for receiving a thrust load acting on the thrust bearing is disposed in an annular space formed between the upper case and the lower case.

3. The thrust bearing for a vehicle according to claim 1, wherein
a load receiving surface is formed at an upper end of the annular liquid inclusion body to upwardly project from the case top surface of the upper case, and
the load receiving surface is in contact with the vehicle body-side attaching portion for receiving a load.

4. The thrust bearing for a vehicle according to claim 1, wherein the suspension is a strut-type suspension.

5. The thrust bearing for a vehicle according to claim 1, wherein
the hydraulic load sensor is connected to a controller that controls a brake of the vehicle by receiving an output signal from the hydraulic load sensor, and
the controller controls a braking force of the brake in accordance with the amount of load vertically acting on the suspension when a driver of the vehicle manipulates the brake.

6. The thrust bearing for a vehicle according to claim 1, wherein the hydraulic load sensor is connected to a controller that controls at least either a damping force of the shock absorber or a spring rate of an air suspension by receiving an output signal from the hydraulic load sensor, and the controller controls at least either the damping force or the spring rate in accordance with the amount of load vertically acting on the suspension.

7. The thrust bearing for a vehicle according to claim 1, wherein the hydraulic load sensor is connected to a controller that controls at least either a damping force of the shock absorber or a spring rate of an air suspension by receiving an output signal from the hydraulic load sensor to monitor longitudinal and lateral balances of the vehicle, and the controller controls at least either the damping force or the spring rate in accordance with longitudinal and lateral differences between the amounts of a vertically acting load measured by each suspension of the vehicle so that the tilt of the vehicle is reduced.

8. The thrust bearing for a vehicle according to claim 1, wherein the hydraulic load sensor is connected to a controller that actively controls a damping force of the shock absorber by receiving an output signal from the hydraulic load sensor to monitor an input load from a tire.

* * * * *